(12) United States Patent
Myers et al.

(10) Patent No.: US 11,354,958 B2
(45) Date of Patent: Jun. 7, 2022

(54) WIRELESS DEVICE ENABLED LOCKING SYSTEM HAVING DIFFERENT MODALITIES

(71) Applicant: Delphian Systems, LLC, Buffalo Grove, IL (US)

(72) Inventors: Gary L Myers, Monee, IL (US); Ashok Hirpara, Wayne, IL (US); John D. Veleris, Buffalo Grove, IL (US); Arkadiusz Zimny, Hampshire, IL (US); Eugene Nakshin, Round Lake, IL (US); Michael Aaron Cohen, Buffalo Grove, IL (US)

(73) Assignee: DELPHIAN SYSTEMS, LLC, Buffalo Grove, IL (US)

( * ) Notice: Subject to any disclaimer, the term of this patent is extended or adjusted under 35 U.S.C. 154(b) by 269 days.

(21) Appl. No.: 16/815,208

(22) Filed: Mar. 11, 2020

(65) Prior Publication Data
US 2020/0312072 A1    Oct. 1, 2020

Related U.S. Application Data

(63) Continuation-in-part of application No. 15/631,983, filed on Jun. 23, 2017, now Pat. No. 10,832,506, (Continued)

(51) Int. Cl.
*G07C 9/27* (2020.01)
*G07C 9/00* (2020.01)
(Continued)

(52) U.S. Cl.
CPC ............ *G07C 9/27* (2020.01); *G07C 9/00571* (2013.01); *G07C 9/20* (2020.01); *H04L 63/10* (2013.01);
(Continued)

(58) Field of Classification Search
CPC ........ G07C 9/27; G07C 9/20; G07C 9/00571; G07C 9/00309; G07C 2009/00309;
(Continued)

(56) References Cited

U.S. PATENT DOCUMENTS

| 6,927,684 B2 | 8/2005 | Joyner et al. |
| 7,012,503 B2 | 3/2006 | Nielson |

(Continued)

FOREIGN PATENT DOCUMENTS

| JP | 2007316949 A | 12/2007 |
| WO | 02100040 A1 | 12/2002 |
| WO | 2006136662 A1 | 12/2006 |

*Primary Examiner* — Hee K Song
(74) *Attorney, Agent, or Firm* — David L. Cohen

(57) ABSTRACT

An encrypted security system and associated methods for controlling physical access are described. The system includes a security server configured to receive a request for authentication from a mobile device, the request including information identifying the mobile device and a physical access control device. The security server forwards an encryption message including a plurality of unique identifiers to the physical access control device via the mobile device. The physical access control device is configured to authenticate the plurality of unique identifiers in the encryption message and operate an access control mechanism.

57 Claims, 24 Drawing Sheets

Related U.S. Application Data which is a continuation of application No. 14/792,760, filed on Jul. 7, 2015, now Pat. No. 9,691,201, which is a continuation of application No. 13/162,334, filed on Jun. 16, 2011, now Pat. No. 9,077,716.

(60) Provisional application No. 61/355,303, filed on Jun. 16, 2010, provisional application No. 61/430,621, filed on Jan. 7, 2011, provisional application No. 61/518,240, filed on Apr. 25, 2011.

(51) Int. Cl.
    *H04W 12/08* (2021.01)
    *G07C 9/20* (2020.01)
    *H04L 9/40* (2022.01)
    *G06F 21/34* (2013.01)

(52) U.S. Cl.
    CPC ............ *H04W 12/08* (2013.01); *G06F 21/34* (2013.01); *G07C 9/00309* (2013.01); *G07C 2009/00412* (2013.01); *G07C 2009/00769* (2013.01)

(58) Field of Classification Search
    CPC ........... G07C 2009/00412; G07C 2009/00769; H04L 63/10; H04W 12/08; G06F 21/34
    See application file for complete search history.

(56) References Cited

U.S. PATENT DOCUMENTS

| | | |
|---|---|---|
| 7,873,989 B2 | 1/2011 | Karkas et al. |
| 8,811,272 B2 | 8/2014 | Stefan |
| 2002/0031228 A1 | 3/2002 | Karkas et al. |
| 2002/0095588 A1 | 7/2002 | Shigematsu et al. |
| 2005/0099262 A1 | 5/2005 | Childress et al. |
| 2005/0216144 A1 | 9/2005 | Baldassa |
| 2006/0143463 A1 | 6/2006 | Ikeda et al. |
| 2007/0197261 A1 | 8/2007 | Humbel |
| 2007/0300307 A1 | 12/2007 | Duncan |
| 2008/0034422 A1 | 2/2008 | Al-Azzawi |
| 2008/0076420 A1 | 3/2008 | Khetawat et al. |
| 2008/0319665 A1 | 12/2008 | Berkobin et al. |
| 2009/0176487 A1 | 7/2009 | DeMarco |
| 2013/0326595 A1* | 12/2013 | Myers ................... H04W 12/08 726/4 |

* cited by examiner

Pattern definition and space definition

PATTERN definition

The WEB encryption engine generates a series of PATTERNS representative examples of these are shown below.

WEB code 1

The shape of the PATTERNS is important, the size is not.

WEB code 2 = GOOD

WEB code 3 = BAD

The LOCK encryption engine is a series of PATTERNS that matches the shape not the relative size. There are over 100 shapes being exchanged in each data transmission and these PATTERN size each time

LOCK looks for: triangle, cross, diamond in order

Space requirements for the encryption engine one requires a check on data packet and values that are outside of normal parameters. Such as 99 hours etc.

FIG. 7

COMMUNICATIONS MODES AND PATHS

| | Mobile <-> SAS Connection via: | | PAC <-> SAS Connection via: | Ref # | | Mode |
|---|---|---|---|---|---|---|
| 1 | Cellular WAN | 4 | Mobile device - Cellular WAN | 1,4 | 1.1 | LOCAL |
| 1 | Cellular WAN | 4 | Mobile device - Cellular WAN | 1,4 | 1.2 | LOCAL |
| 1 | Cellular WAN | 4 | Mobile device - Cellular WAN | 1,4 | 2.1 | LOCAL |
| 1 | Cellular WAN | 4 | Mobile device - Cellular WAN | 1,4 | 2.2 | LOCAL |
| 2 | WiFi IAP, and ISP WAN | 5,6 | ISP WAN | 2,6 | 2.3 | ONLINE |
| 3 | WiFi IAP, and ISP WAN | 5,6 | ISP WAN | 2,6 | 2.4 | ONLINE |
| 2 | WiFi IAP, and ISP WAN | 5,6 | Cellular WAN | 3,4 | 2.5 | ONLINE |
| 2 | Cellular WAN | 4 | Cellular WAN | 3,4 | 2.6 | ONLINE |
| 1 | Cellular WAN | 4 | Mobile device - Cellular WAN | 1,4 | 3.1 | LOCAL |
| 1 | Cellular WAN | 4 | Cellular WAN | 3,4 | 3.2 | LOCAL |
| 1 | ISP WAN | 5,6 | Mobile device - ISP WAN | 3,5,6 | 3.3 | LOCAL |
| 1 | WiFi IAP, and ISP WAN | 5,6 | Mobile device - Cellular WAN | 1,4 | 3.4 | LOCAL |
| 3 | Cellular WAN | 4 | Mobile device - Cellular WAN | 3,4 | 3.5 | LOCAL |
| 3 | ISP WAN | 5,6 | Mobile device - ISP WAN | 3,5,6 | 3.6 | LOCAL |
| 1 | WiFi IAP, and ISP WAN | 5,6 | Mobile device - Cellular WAN | 3,4 | 3.7 | LOCAL |
| 1 | Cellular WAN | 4 | Cellular WAN | 3,4 | 3.8 | LOCAL |
| 2 | WiFi IAP, and ISP WAN | 5,6 | Cellular WAN | 2,6 | 3.9 | ONLINE |
| 2 | WiFi IAP, and ISP WAN | 5,6 | ISP WAN | 2,6 | 3.10 | ONLINE |
| 2 | Cellular WAN | 4 | Cellular WAN | 2,6 | 3.11 | ONLINE |

FIG. 20

| Operating Scenario | ENVIRONMENT | TECHNOLOGY | |
|---|---|---|---|
| | Local Environment | Network Type used | Mobile <-> PAC Connection via: |
| 1 | WiFi LAN not available. PAC A and Mobile device within P2P proximity. | P2P Ad Hoc Networks - direct device-to-device (Bluetooth or WiFi). | P2P Bluetooth |
| | | | WiFi Ad Hoc P2P Mode |
| 2 | WiFi LAN available. PAC B device and Mobile device within WiFi LAN coverage area and within P2P proximity from one another. | P2P Ad Hoc Networks direct device-to-device (Bluetooth or WiFi). | P2P Bluetooth |
| | | | WiFi Ad Hoc P2P Mode |
| | | OR WiFi Infrastructure Mode (IEEE 802.11) | PAC devices connect via WiFi access point (router) and stay in ONLINE mode. Mobile devices connect to PAC devices in LAN Wifi or P2P mode. |
| 3 | WiFi LAN available. Mobile within WiFi LAN coverage area, PAC B device inside LAN area, PAC A device outside area but within P2P proximity from Mobile device. | P2P Ad Hoc Networks | P2P Bluetooth |
| | | | P2P Bluetooth |
| | | | P2P Bluetooth |
| | | | P2P Bluetooth |
| | | OR WiFi Ad Hoc Direct Mode (IEEE 802.11) | P2P WiFi Ad Hoc Mode |
| | | | P2P WiFi Ad Hoc Mode |
| | | | P2P WiFi Ad Hoc Mode |
| | | | P2P WiFi Ad Hoc Mode |
| | | OR WiFi Infrastructure Mode (IEEE 802.11) | Wi-Fi Infrastructure Mode |
| | | | Wi-Fi Infrastructure Mode |
| | | | Wi-Fi Infrastructure Mode |

FIG. 20(Continued)

| Major System Functions | Roles of Major System Components | | |
|---|---|---|---|
| | SAS | Mobile | PAC |
| 1. Administrative Management<br>Hosted and operated by SAS with administrate access through its web portal (and various interfaces such as https, browser, UI/UX, security, encryption,et.) accessible by computers and mobile devices of authorized users. Handles authentication, authorization, encryption of user devices (mobile or browser access) and PAC devices. | v<br>Provides full system administrative management and control capability | v<br>Provides system access and device access on an ad hoc basis as authorized | No access. |
| 2. Operation (of PAC Devices and Mobile Apps)<br>SAS enables the execution of a PAC device operation directly (through the an Internet Access Point available to the PAC device) or through the mobile devices of authorized users. Authenticates and authorizes operational transactions per administrative access rights for PAC devices and user mobile device as required. | v<br>Authenticates and authorizes system devices (i.e. mobile, and PAC) for operation transactions. Enforces communication security including encryption methods and policies. | v<br>Enables bidirectional communication between SAS and PAC devices. Requests device operations and other system communication transactions. | v<br>Operates per device capabilities and functionality as required and/or authorized |
| 3. Monitoring & Reporting<br>Function operated and provided by SAS which monitors and logs all system transactions and provides transaction confirmations, reports, notifications to authorized users. | v<br>Provides all required administrative logs, reports, and user notifications | v<br>Reports all transactions (between SAS, PACs, and mobile devices as required/ authorized | v<br>Reports status and conditions as required and/or authorized |

FIG. 21

| PAC | Notes |
|---|---|
|  | Always available through the SAS web browser internet connection. |
| Can be operated by SAS or mobile device in Local mode or Online mode. | Mobile and PAC device groups can be configured to operate in one of three modes:<br>1. Online mode only<br>2. Local mode only<br>3. Either one Online or Local (automatically and seamlessly based on availability and preference sequence). |
| Can monitor and report device-specific conditions and status to SAS directly in Online mode or indirectly through a mobile device in Local mode or Online mode. | SAS monitors PAC operation transactions and conditions, and makes such Logs and Reports by user(s) and device(s) available based on administrative access control rules and configuration (upon user demand, or upon nature of condition, etc.). |

Ⓐ

NOMENCLATURE

PAC to SAS directly via LAN/Access Point internet connection

PAC to SAS via mobile device internet connection

PAC to mobile device via P2P

FIG. 22

| Major System Functions (for system users and devices) | Roles of Major System Components (MSC) | |
|---|---|---|
| | SAS | Mobile |
| 1. Administration | Always in Online mode. Manages all system PAC devices and users. | |
| 2. PAC Device Operation | Authenticates, authorizes, and operates PAC devices directly in Online mode or through an operation request of a mobile device in either Online or Local mode. | Can operate a PAC device in Online mode or Local mode. |
| 3. Monitoring & Reporting | Monitors conditions and status of all PAC devices and provides reports to authorized users accordingly. | Initiates PAC operation transactions and status confirmation reports to SAS. |

FIG. 22(Continued)

WIRELESS DEVICE ENABLED LOCKING SYSTEM HAVING DIFFERENT MODALITIES

CROSS-REFERENCE TO RELATED APPLICATIONS

This patent application is a continuation-in-part of U.S. patent application Ser. No. 15/631,983 filed on Jun. 23, 2017, entitled "Wireless Device Enabled Locking System," which is a continuation of and claims priority of U.S. patent application Ser. No. 14/792,760 (U.S. Pat. No. 9,691,201), which is a continuation of and claims priority of U.S. patent application Ser. No. 13/162,334, filed Jun. 16, 2011 (U.S. Pat. No. 9,077,716), entitled "Wireless Device Enabled Locking System," which in turn claims the benefit of U.S. Provisional Patent Application No. 61/355,303 filed Jun. 16, 2010, U.S. Provisional Patent Application No. 61/430,621 filed Jan. 7, 2011, and U.S. Provisional Patent Application No. 61/518,240 filed Apr. 25, 2011, all of which are incorporated herein by reference in their entireties, including without limitation all drawings and figures therein.

FIELD OF THE DISCLOSURE

This patent disclosure relates generally to lock devices and more particularly to a method and system for a wirelessly enabled locking device.

BACKGROUND

Physical locks still serve an important function in commercial and consumer contexts today, ensuring that persons who are not entitled or authorized to access premises, products or materials are restricted from such access, while ensuring that those who require access do obtain it. In both commercial and consumer contexts, either an unauthorized access or an unintended refusal of access can have financial consequences, for example, and may cause delay and disruption. Thus, access management is important. However, full access management can be costly and time consuming, and is, sometimes, also inefficient to implement. Moreover, tracking access activities, while important, can be difficult and tedious with existing systems. Finally, electronic security considerations for access management systems are difficult to reliably implement.

It will be appreciated that this background description has been created by the inventor to aid the reader, and is not to be taken as a reference to prior art nor as an indication that any of the indicated problems were themselves appreciated in the art. While the described principles can, in some regards and embodiments, alleviate the problems inherent in other systems, it will be appreciated that the scope of the protected innovation is defined by the attached claims, and not by the ability of the claimed invention to solve any specific problem noted herein.

SUMMARY OF THE PRESENT DISCLOSURE

In one aspect of the invention, an encrypted security system for controlling physical access is provided. The system includes a security server configured to receive a request for authentication from a mobile device, the request comprising information identifying the mobile device, and a physical access control device and a command for the physical access control device. The physical access control device comprises a controller and an access device. In response to the request for authentication, the security server forwards an encryption message comprising a plurality of unique identifiers to the physical access control device via the mobile device. The physical access control device is configured to authenticate the plurality of unique identifiers in the encryption message and operate an access control mechanism (i.e., an access device) based on the command. The system operates in different modalities (e.g., Online Modes, Local Modes or Modes of operation) depending on the type of wireless communication networks through which the security server, the mobile device, and the physical access control device communicate with each other.

In another aspect of the invention, a method of providing security in a wireless system for controlling physical access is provided. The method comprises receiving a request for authentication from a mobile device, the request comprising information identifying the mobile device, a physical access control device, and in response to identifying the mobile device and the physical access control device, generating an encryption message comprising a plurality of unique identifiers, and forwarding the encryption message to the physical access control device so as to cause the physical access control device to authenticate the plurality of unique identifiers in the encryption message and perform an access control operation (for example, restriction of physical access) on an access device.

BRIEF DESCRIPTION OF THE DRAWINGS

While the appended claims set forth the features of the present invention with particularity, the invention and its advantages are best understood from the following detailed description taken in conjunction with the accompanying drawings, of which:

FIG. 7 is an encryption pattern and space value definition diagram in accordance with an embodiment of the disclosed principles;

FIG. 20 is a table categorizing the scenarios of the Local and Online Modes of operation depicted in FIGS. 18 and 19.

FIG. 21 is a table summarizing the three major system functions and Core function of the system.

FIG. 22 is a table summarizing the roles of the major system components with regard to the major system functions.

DETAILED DESCRIPTION

The following examples further illustrate the invention but, of course, should not be construed as in any way limiting its scope.

Figure 1:
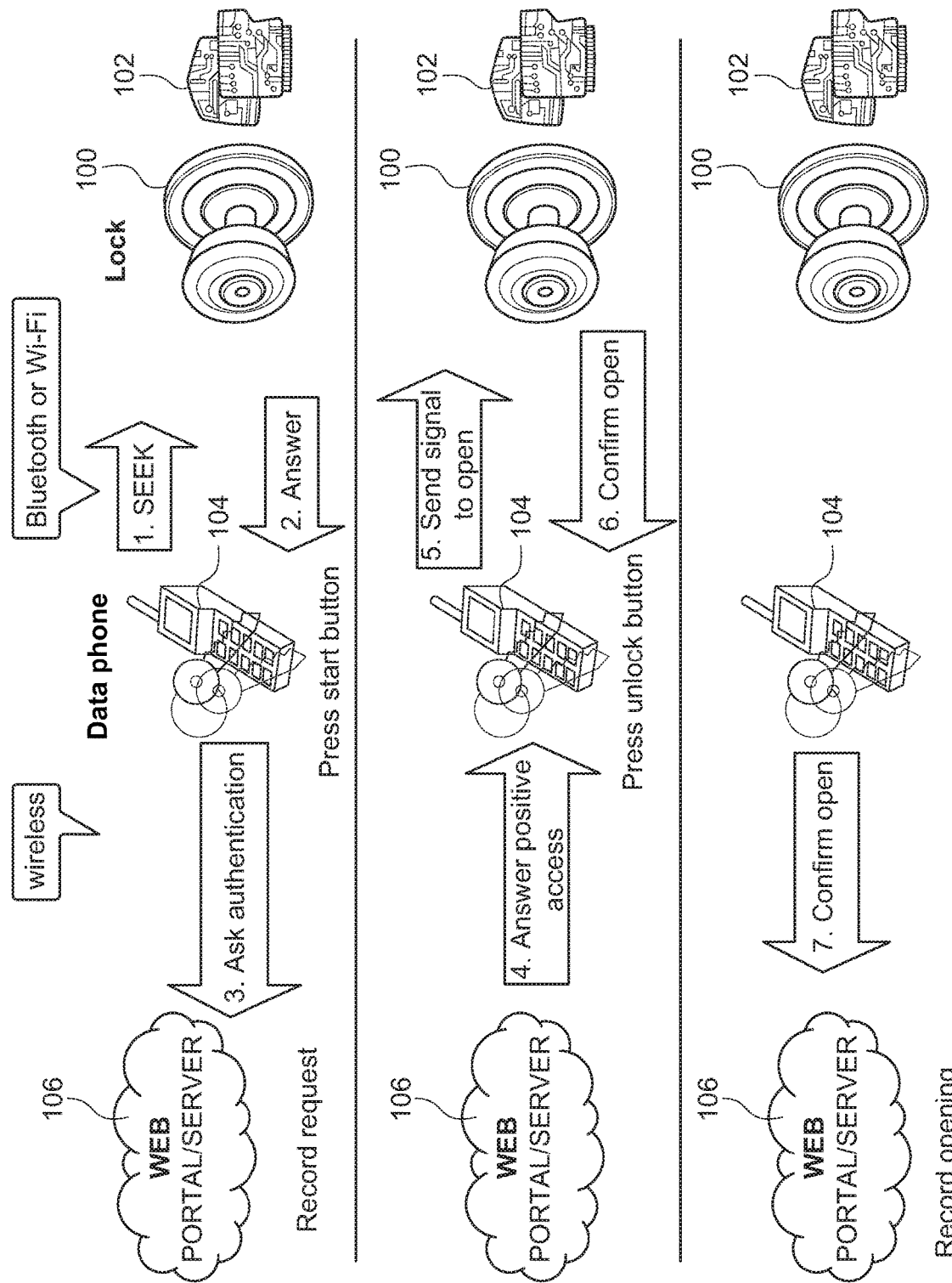
FIG. 1 is a schematic diagram showing an embodiment of the data flow and relationships in accordance with the disclosed principles.

Turning to FIG. 1, an embodiment of a system for wirelessly operating physical access devices, such as locks, is shown. The system includes an access device 100, such as a gate or a lock, including an entry door lock, a hotel room door lock, a garage door lock, a safe lock, a drawer lock, a table lock, or the like. The lock 100 further includes a communication and control module 102 (the terms "communication and control module," "controller," and control board are used interchangeably), which may be incorporated within or externally connected to the housing of the lock 100, configured to wirelessly communicate with a mobile device 104 in proximity of the lock 100. The lock having at least a controller is referred to as a physical access control device. In the illustrated embodiment, the system further includes a Security Authentication Server (SAS), such as web server or portal 106, that includes non-transitory computer readable memory medium and a processor for storing and executing computer executable code comprising an encryption engine configured to process an authentication request from the mobile device 104 in connection with gaining control of the lock 100. As described in further detail below, when the mobile device 104 is in proximity of the lock 100, it establishes a wireless connection with the communication and control module 102, for example via a short-range wireless protocol, (e.g., short-range wireless network) such as Bluetooth, Wi-Fi, Zigbee, Z-wave, or the like. In an embodiment, the mobile device 104 commences establishing a wireless connection with the lock 100 upon receiving user input from a user interface displayed on the mobile device 104 (e.g., when the user presses a start button via the user interface to establish a connection to a listed lock). In another embodiment, the mobile device 104 automatically establishes a wireless connection to communication and control module 102 of the lock 100 upon detecting its proximity, for example via automatic Bluetooth pairing when the lock 100 has been pre-configured in the lock database stored in the mobile device 104. Upon establishing contact with the lock 100, the mobile device 104 forwards an authentication request to the web portal 106 via a wide-area wireless access network capable of providing a data connection, including a connection to the Internet. In embodiments, the wide-area wireless access network operates in accordance with a wireless communication protocol, such as GSM, GPRS, EDGE, CDMA, CDMA 2000, Ev-Do, WI-MAX, UMTS, LTE, or the like. The processor of the web portal 106 executes computer readable code of an encryption engine that generates a series of patterns, such as shape patterns, and parameter parity checks for transmission to the communication and control module 102 of the lock 100 via the mobile device 104. When the communication and control module 102 of the lock 100 matches a predetermined shape pattern stored thereon to the shape pattern received from the web portal 106 and successfully executes a parameter parity check, it opens the lock 100 and sends a confirmation of the opening to the mobile device 104. The mobile device 104, in turn, relays the confirmation to the web portal 106 for logging the access event.

Figure 2:
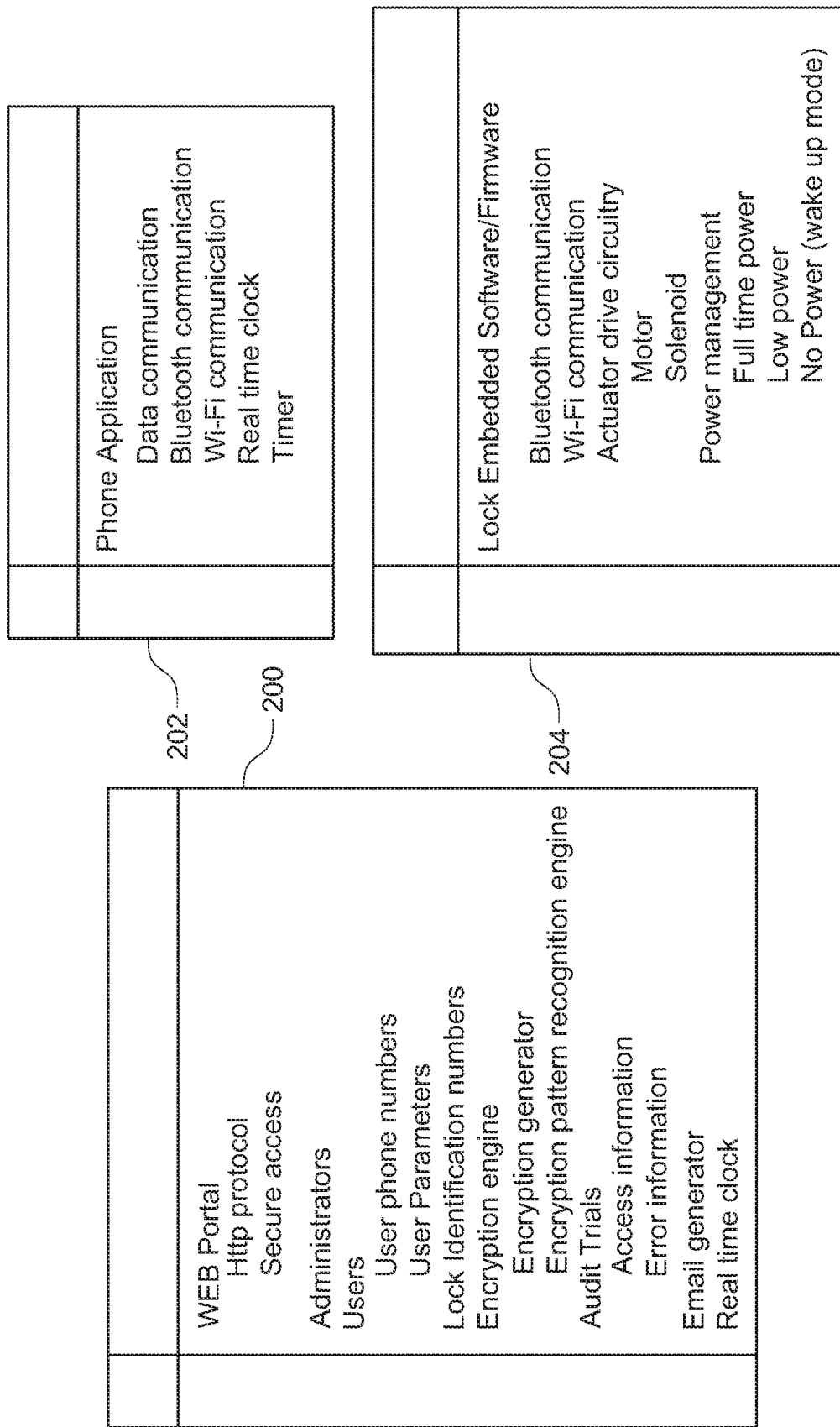
FIG. 2 is an architectural diagram showing aspects residing at three points of the system in accordance with an embodiment of the disclosed principles.

Turning to FIG. 2, an embodiment of data structures stored on respective non-transitory computer readable memory media of web portal/SAS 106, mobile device 104, and communication and control module 102 of the lock 100 is shown. Embodiments of the non-transitory computer readable memory of the foregoing hardware devices include flash, RAM, ROM, hard drive, and other types of non-transitory storage media. In the illustrated embodiment, the web portal 106 stores a data structure 200 including information regarding the following items: type of data protocol used to communicate with the mobile device (e.g., an HTTP protocol), an indicator that the communication is secured via the encryption engine, user parameters and phone number information, an administrator list, unique lock identification numbers, audit trail information, including access and error logs, email generator module (e.g., for forwarding email alerts and reports regarding access events to the administrator), as well as a real time clock for correlating with a mobile device authentication timer discussed below.

Figure 3:
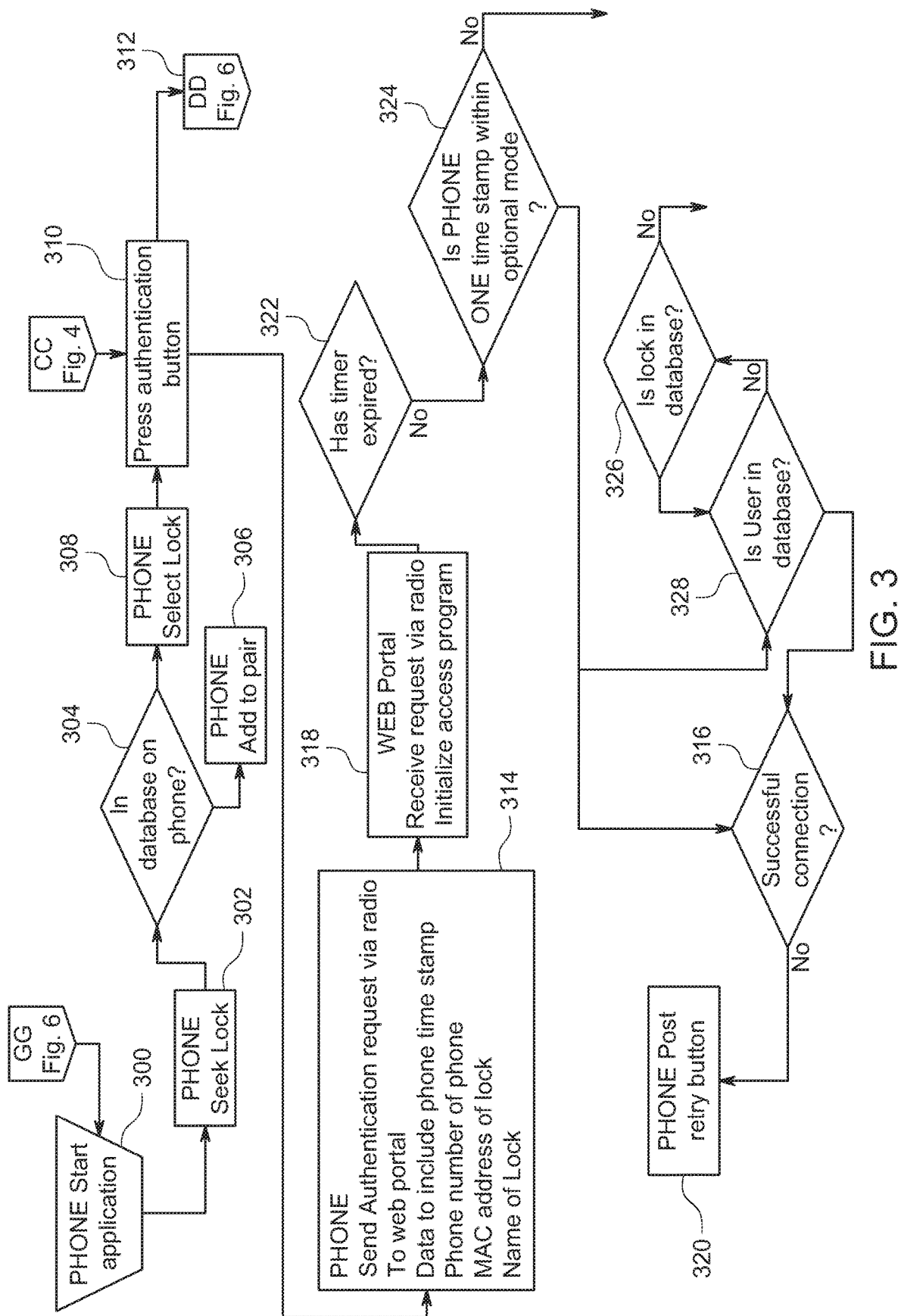
FIG. 3 is a flow chart illustrating a process flow in accordance with an embodiment of the disclosed principles.

Computer readable memory of the mobile device 104 stores executable instructions comprising an application 202 that provides the user interface for interacting with the lock 100 and further includes a real time clock and an authentication timer (FIG. 3). Additionally, embedded firmware 204 stored and executed via a processor associated with the communication and control module 102 of the lock 100 includes instructions for communicating with the mobile device via one or more short-range wireless protocols, as well as instructions for controlling actuator drive circuitry of the lock 100, such as motor and solenoid devices. The firmware 204 further includes executable instructions relating to lock power management, such as whether the lock is in full time power mode, low power mode, or whether the lock is in a sleep mode. For example, when the lock is connected to line power, it is in full power mode. If the lock is running on battery, then a low power mode is used with sleep mode being activated after a period of inactivity.

Turning to FIGS. 3-6, an embodiment of a method for providing security in a wireless system for operating access devices, is shown. Referring to FIG. 3, in steps 300-302, when the user launches a lock access application on the mobile device 104, a mobile device processor begins executing computer readable instructions comprising said application for interfacing with the lock 100 and web portal 106. In one embodiment, the application prompts the user to enter a Lock ID when the user launches the application. In an embodiment, the Lock ID is a string of alphanumeric characters, e.g., with a thirty two (32) character maximum, which are visible on the door. The Lock ID has a provision for customization of naming via the user interface of the mobile device 104. Upon identification of the desired Lock ID, the mobile device 104, such as a mobile phone, starts seeking whether the lock 100 is in proximity of the mobile device 104 so as to connect or pair with the lock. The lock 100 may alternatively or in addition transmit the Lock ID identifier as a Bluetooth identifier and/or a Wi-Fi device identifier. In embodiments, the phone 104 connects or pairs with the lock 100 without the need for displaying the Lock ID on the door and/or without initial user input of the Lock ID (e.g., based on displaying a list of available Lock IDs in proximity of the phone 104 for user selection). In steps 304-308, if the identifier of the lock 100 is pre-stored in the database of the phone 104, the phone 104 presents the user with an interface for selecting the lock 100 to access. Otherwise, the user is prompted to add the identifier of the lock 100 to the lock database stored in the phone 104 prior to selecting the lock 100 for access. Once the user selects the identifier of the lock 100, the phone 104 begins the authentication process with the lock 100, such as by displaying an authentication button, step 310. Alternatively, the authentication process begins upon user selection of the paired or connected lock without the need for further user input. The interface of the phone 100 may also allow the user to setup one or more Lock IDs to enable automatic connection and selection of one or more locks for authentication when the phone is in proximity of the lock(s). In step 312, lock data, such as new lock identifiers, is stored in the mobile device database.

Figure 6:
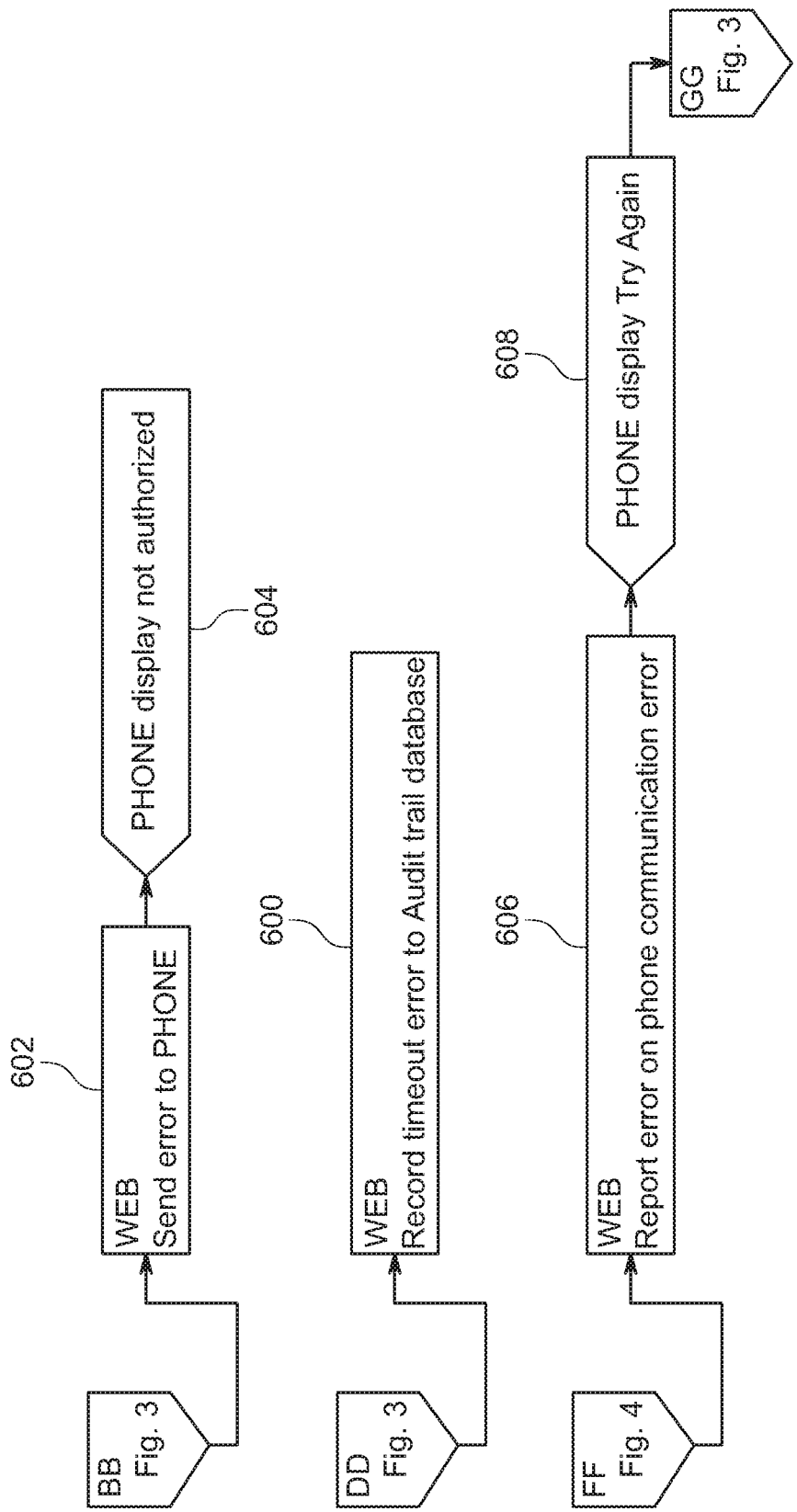
FIG. 6 is a flow chart illustrating a process flow in accordance with an embodiment of the disclosed principles.

In step 314, the application of the phone 104 communicates an authentication request via a wide area access network to the web portal 106. The authentication request includes the unique identifier of the lock (i.e., Lock ID), telephone number of the phone 104, a unique phone identifier code that is retrieved from the phone by the application, a Media Access Control (MAC) address of the lock 100, as well as a time stamp. In an embodiment, the unique phone identifier is a serial number and/or an identifier generated by the phone application and stored in an encrypted manner in the phone. The authentication request is transmitted to the web portal/SAS 106 as a data message using an HTTP protocol with JavaScript Object Notation (JSON) for data serialization. If the data connection to the web portal 106 is successful (e.g., when an acknowledgement is received), the web portal 106 initializes execution of the access program code, steps 316-318. Otherwise, in step 320, the phone 104 retries the transmission of the authentication request message. In step 322, the web portal 106 checks whether an authentication timer has expired (the phone application receives the authentication timer from the web portal/server 106, where it was initiated according to user criteria, and maintains in memory to allow the lock to be operated within a specified time). If the timer expiration check is positive, then the processing continues to block DD of FIG. 6, where the web portal records a timeout error in an audit trail database (FIG. 6, step 600). Otherwise, the web portal 106 next checks whether the phone time stamp received via the authentication message is within the operational mode, step 324. If not, then the processing continues to block BB of FIG. 6, where the web portal sends an error message to the phone regarding lack of authorization (FIG. 6, steps 602-604). Otherwise, the web portal checks (step 326) whether the received lock information from the authentication message matches a lock in the web portal's database. If the lock information is not in the web portal's database, the processing returns to block BB of FIG. 6 (discussed above). However if the received lock information matches a lock in the web portal's database, the web portal next performs a similar check with respect to identifying a registered user based on the user-related information in the authentication message (e.g., based on the phone number), step 328. If the user is registered in the web portal's database, the processing continues to block AA of FIG. 4. If the user is not in the web portal's database, the processing loops back to block BB of FIG. 6.

Figure 4:
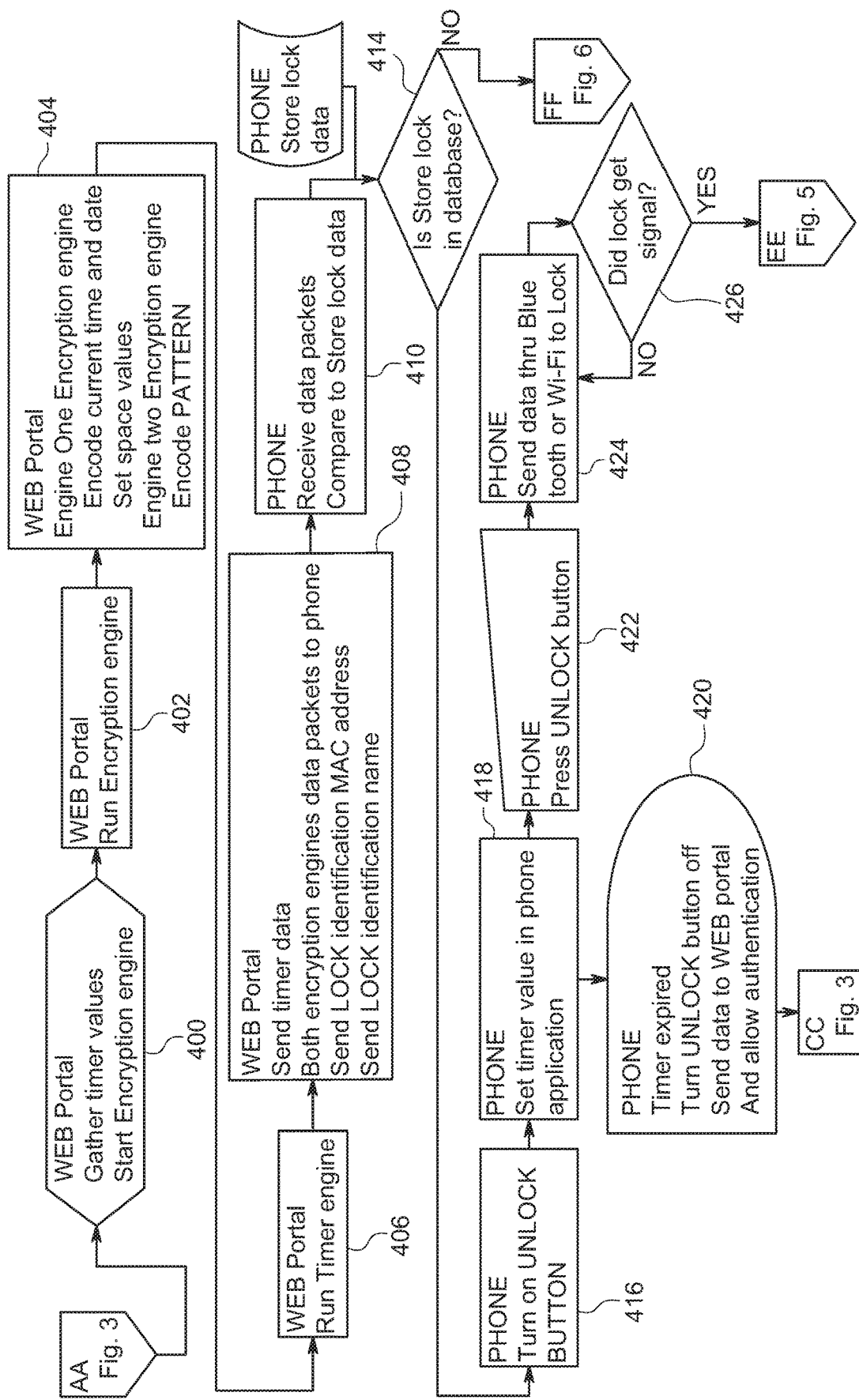
FIG. 4 is a flow chart illustrating a process flow in accordance with an embodiment of the disclosed principles.

Referring to FIG. 4, when the web portal 106 determines that the user is in its database of registered users (from step 328 in FIG. 3), the web portal 106 gathers the timer values and starts executing computer readable code stored therein comprising an encryption engine, steps 400-402. In general, upon request from the phone application, the web portal/SAS 106 will generate a Public Key and use this to generate an Encryption Key. The web portal 106 then sends both the Public Key and the Encryption Key to the application. Provided the application receives authorization from the web portal 106, the application then encrypts an "UNLOCK" message via the Encryption Key and sends the message to the lock 100 in the door. The lock 100 then decrypts the message using the same algorithm and operates the lock motor into the desired position (e.g., an "UNLOCK" position). Specifically, referring again to FIG. 4, in step 404 the encryption engine of the web portal 106 encodes the current time/date and sets space values (e.g., serial number and command, such as open or close command, via a first encryption engine module), as well as encodes a pattern for subsequent transmission to the lock 100 (e.g., via a second encryption engine module), as further described in FIG. 7 below. In steps 406-408, the web portal runs the time engine and sends the following data to the phone 104: timer data, data encrypted by both encryption engine modules discussed in step 404, as well as sends lock identification MAC address and name. In steps 410-412, the phone 104 receives the above data from the web portal and compares the received information to the stored lock identification data (e.g., lock name and MAC address). If the received lock identification data is in the phone's database, the phone activates an "UNLOCK" button at its user interface and sets a timer value in the phone application, steps 414-418. In the event the received lock identification data is not in the phone's database, the processing continues at block FF of FIG. 6 where the phone displays a communication error and prompts the user to try again (FIG. 6, steps 606-608). In step 420, if the authentication timer has expired the phone deactivates the "UNLOCK" button at the user interface. The phone also transmits the timer value to the web portal and the process continues at block CC of FIG. 3. In step 422, if the timer value has not yet expired, the phone 104 presents the user with a menu to press the "UNLOCK" button. If the timer has expired, then the user may imitate another unlock request. In step 424, the phone 104 sends the data received in step 408 from the web portal 106 to the lock 100 (e.g., via a short-range wireless connection such as Bluetooth, Wi-Fi, Zigbee, and/or Z-wave, or the like). In step 426, if the lock 100 has not received the transmission from the phone 104, the transmission is retried. Otherwise, the lock 100 begins its authentication process at block EE of FIG. 5.

Figure 5:
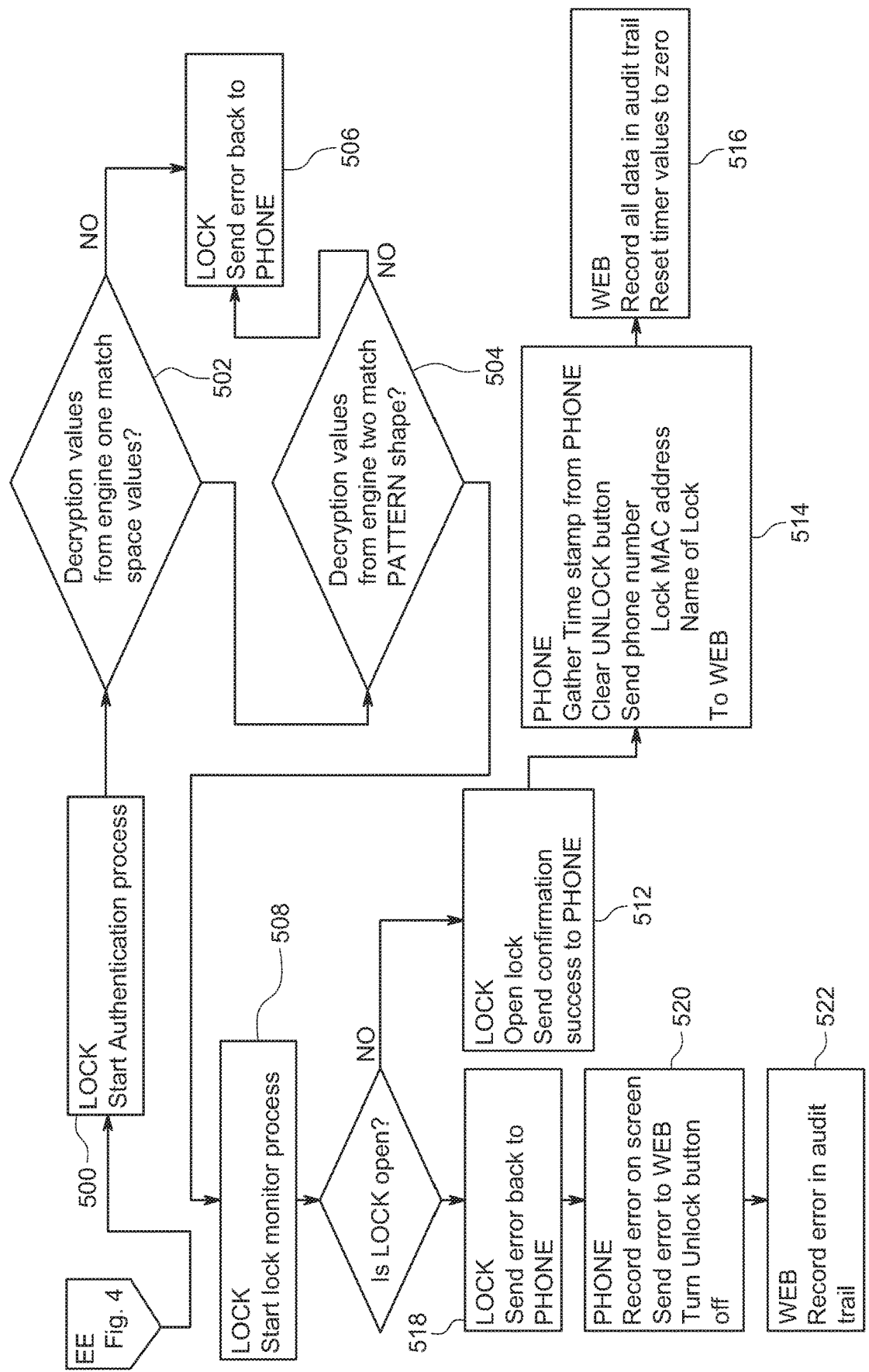
FIG. 5 is a flow chart illustrating a process flow in accordance with an embodiment of the disclosed principles.

Referring to FIG. 5, in steps 500-502, the lock 100 begins its own authentication process by executing an encryption engine that checks whether the space values of the first encryption module, which are received from the web portal 106 (see FIG. 4, step 404) via the phone 100, match the serial number and command stored in the lock. In step 504, the encryption engine of the lock 100 performs a check whether the pattern shapes of the second encryption module, which are received from the web portal 106 (see FIG. 4, step 404) via the phone 100, match the pattern shapes stored in the lock. If either the lock space values or the pattern shapes stored in the lock do not match those received from the web portal 106, the lock sends an error to the phone for notifying the user, step 506. If both space values and pattern shapes received from the web portal match those stored in the lock, the lock in steps 506-508 checks whether the lock is already open. If the lock is not in the open state, then the lock opening mechanism is actuated to open the lock and a confirmation is sent to the phone, step 510. In step 512, the phone creates a time stamp, clears the "Unlock" button at the user interface, and sends the phone number, lock name, and lock MAC address to the web portal for recording. In step 514, the web portal records the lock open event data in the audit trail and resets the authentication timer to zero.

When the lock was already in the open state, in steps 516-518, the lock sends an error back to the phone, which displays it via the user interface and forwards it to the web portal. Consequently, in step 518, the phone deactivates the "Unlock" button. Finally, in step 520, the web portal records the error in the audit trail.

Turning to FIG. 7, an embodiment of encryption pattern and space definitions employed by the web portal 106 and lock 100 is shown. The web portal's encryption engine generates a series of patterns, for instance a plurality of distinct geometric shape patterns 700 shown in FIG. 7. Each geometric shape is represented as a numeric function. For example, a triangle is represented as a sequence of numbers, such as "1004535"). Alternatively or in addition Secure Socket Layer (SSL) Advanced Encryption Standard (AES) message encryption is employed. In one embodiment, the geometric patterns 700 are assigned a predetermined order. As discussed above in connection with FIGS. 4-5, the lock 100 receives the shape patterns 700 from the web portal 106, via the phone 104, and compares the received encryption pattern shapes to those previously stored therein. Preferably, the encryption engine of the lock 100 matches the relative shape of the received patterns. In an alternative embodiment, the shape size is also encoded into the transmitted pattern data. Alternatively or in addition, as part of the authentication process executed by the encryption engine of the lock, a comparison of the assigned order indicators of the received patterns to the order indicators of the matching patterns in the lock's memory is made. With respect to the space values encryption, in an embodiment, it entails a parity check on the length of the data packet sent from the web portal to the lock, as well as a check on the values of received parameters being within the predetermined "normal" ranges (e.g., a time stamp value of "99" hours is outside of the predetermined "normal" range).

Figure 8:
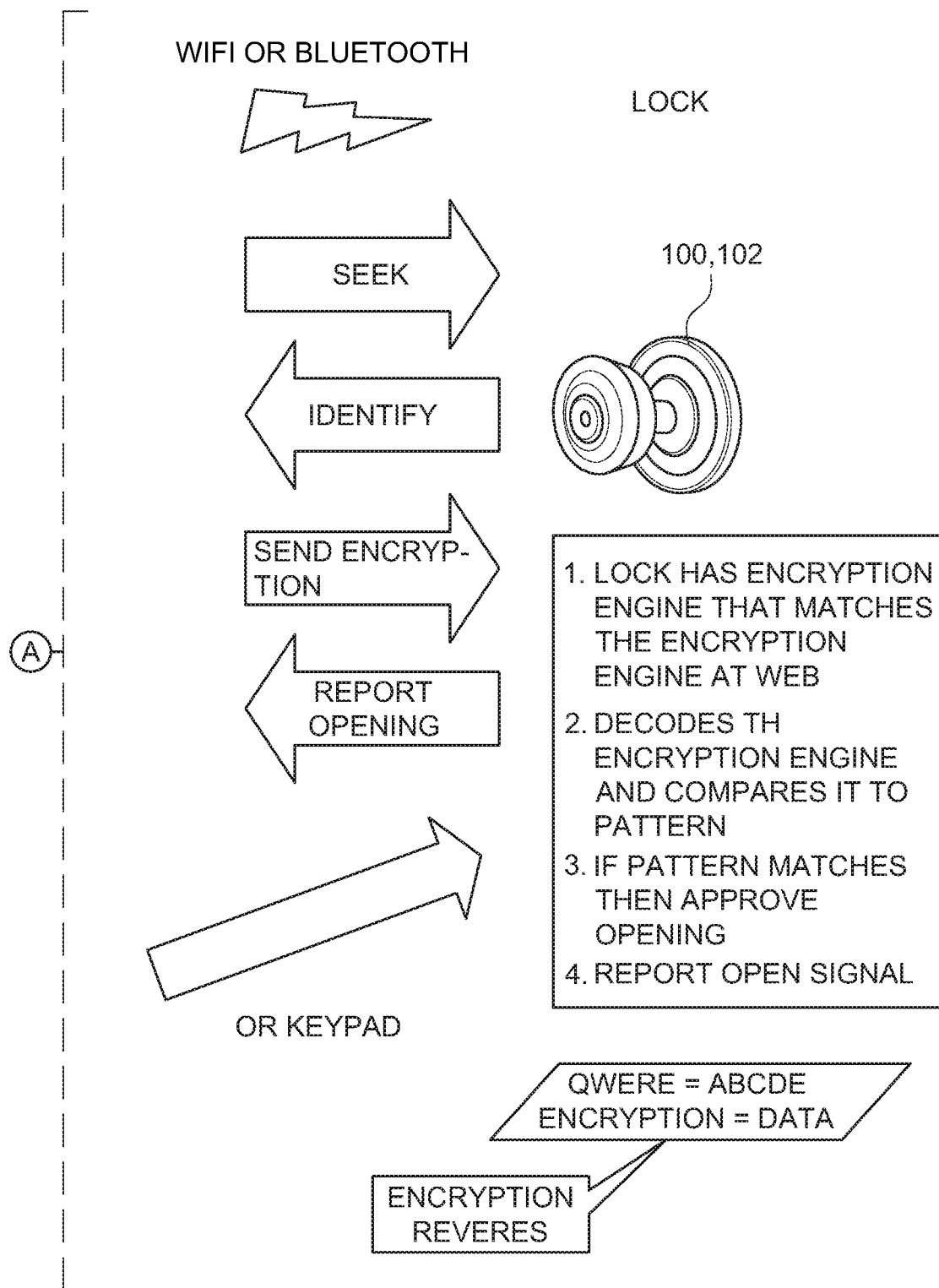
FIG. 8 is an architectural overview showing data flow and activities in accordance with an embodiment of the disclosed principles.
Figure 8:
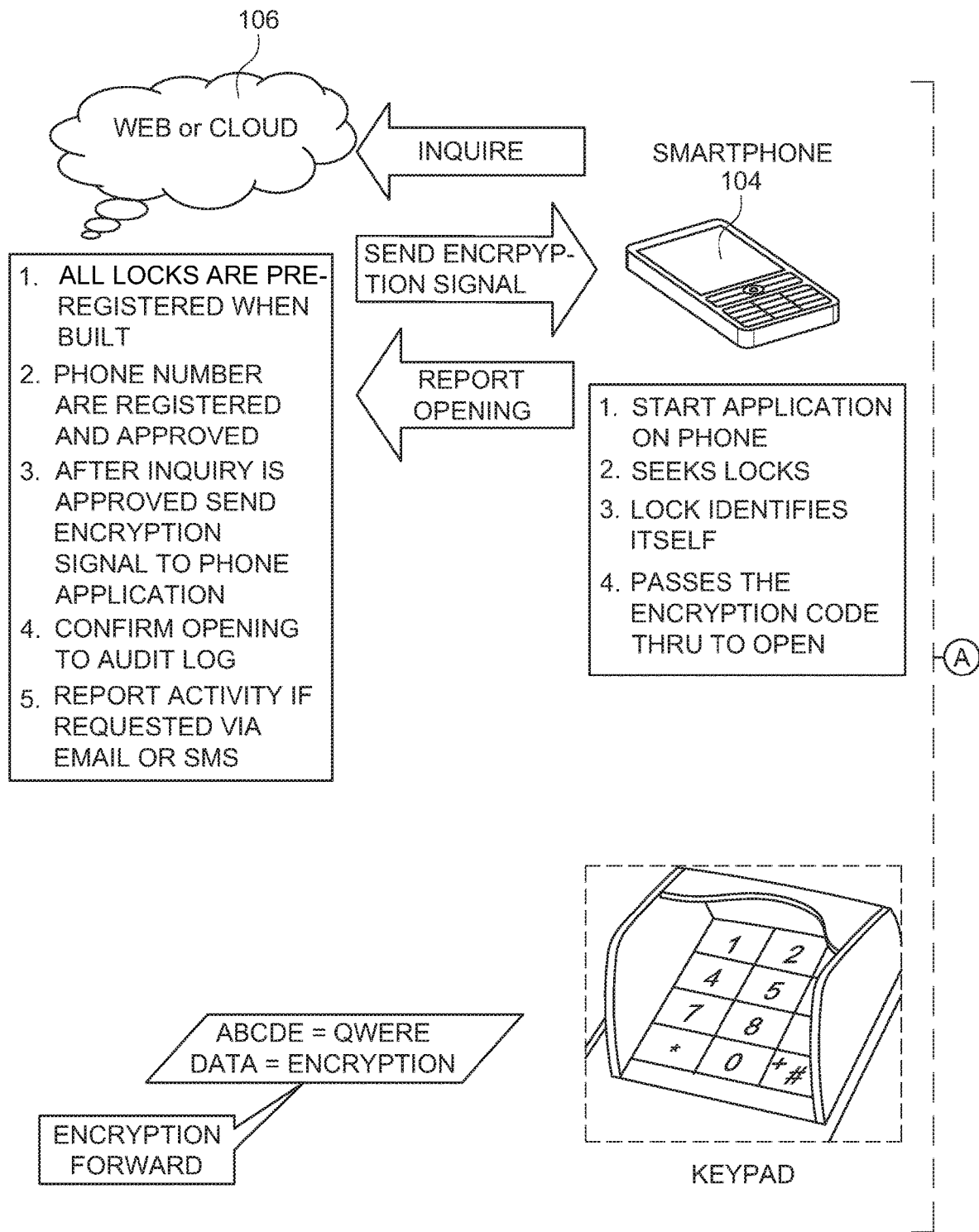

Turning to FIG. 8, an embodiment of system components and associated functionality is shown. The lock 100 is preregistered at the web portal 106 when built (e.g., during or prior to installation). Additionally, the web portal 106 includes a database of approved phone numbers. During authentication, the web portal 106 sends an encryption message, discussed above, to the phone application for interacting with the lock 100. The web portal 106 confirms access events and records them in an audit log and is capable of reporting the logged activity via email or SMS if requested. An application executing on the mobile device, such as a smart phone 104, communicates with a lock 100 in its vicinity and passes the encryption message to the lock. The lock 100, in turn, includes a processor executing computer readable instructions stored in memory of the lock. Specifically, the lock 100 includes an encryption engine that decodes the message received from the web portal 106, including comparing the received pattern to that stored in the memory of the lock. When the pattern match occurs, the lock 100 activates the opening mechanism and reports the open event to the web portal 106 via the phone 104. In an embodiment the lock opening mechanism comprises a lock cam that rotates ninety degrees from unlocked to locked position and vice versa. In embodiment, the lock 100 is powered by batteries. Alternatively, the lock 100 may be powered by line voltage.

Figure 9:
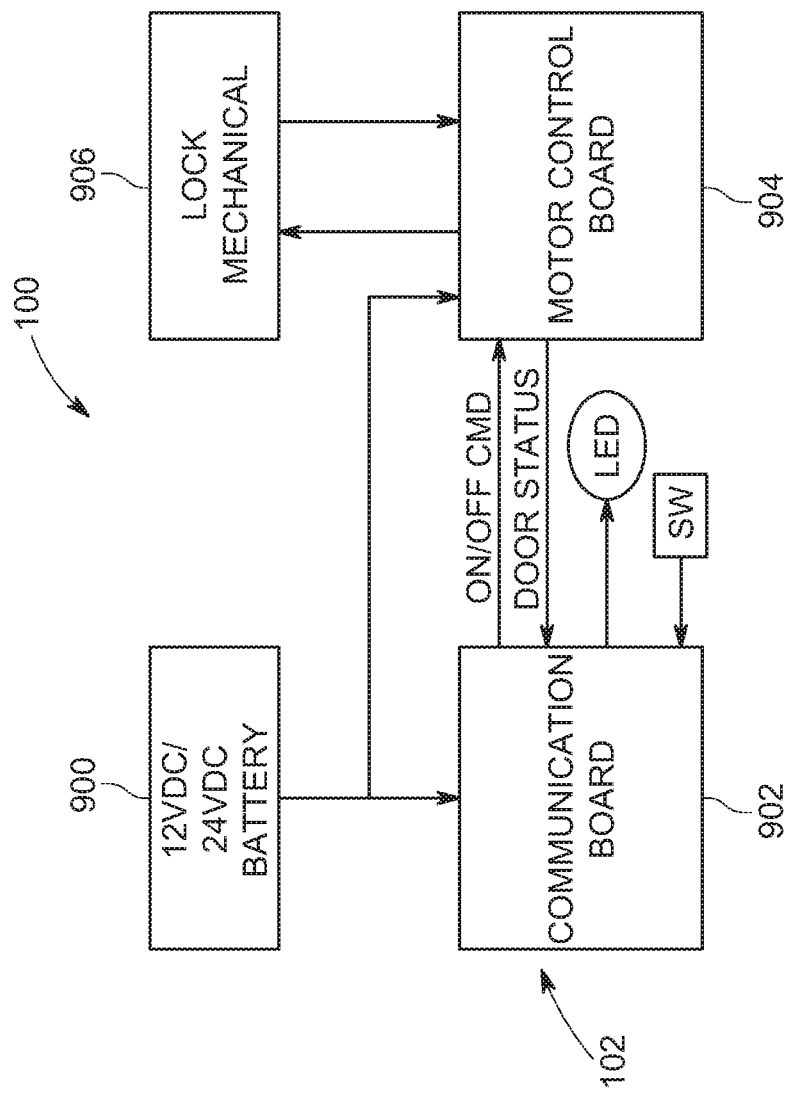
FIG. 9 is a schematic overview of the components of the lock assembly in accordance with an embodiment of the disclosed principles.

Turning to FIG. 9, an embodiment of the hardware components of the wireless lock 100 is shown. The lock 100 includes a battery 900 for providing electrical power to a communication board 902 and motor control board 904 of the communication and control module 102 (FIG. 1). The communication board 902 includes a short range transceiver for communicating with the phone 104, as well as a processor and computer readable memory that stores executable instructions comprising the lock encryption engine described above. The communication board 902 relays on/off (open/close) commands to the motor control board 904, which controls the mechanical lock opening mechanism 906. Embodiments of the lock opening mechanism 906 include but not limited to a mortise lock, a dead bolt, a buzzer operated lock, a garage opening mechanism, among others.

Figure 10:
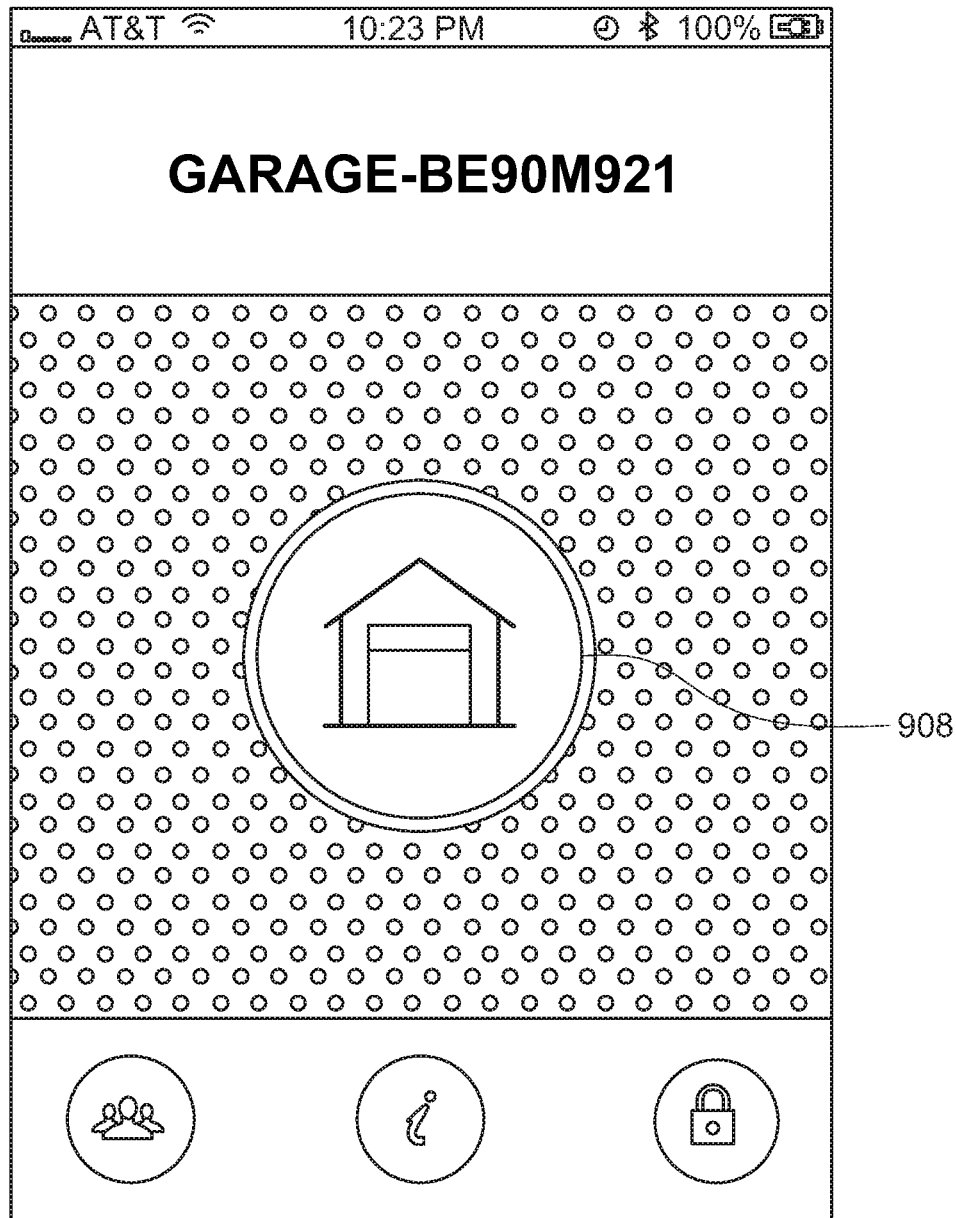
FIG. 10 is a diagram illustrating an embodiment of a user interface screen for graphically displaying the status of a physical access control device.

Turning to FIG. 10, an embodiment of a user interface screen of the phone 104 graphically displaying the status of the lock 100 is shown. In the illustrated embodiment, an icon 908 is color-coded to represent the open or locked status of the lock 100. For instance, when the icon 908 is red, the lock is closed. When the icon 908 is blue, the lock is open. This allows the user to determine, upon wirelessly connecting to the lock 100 whether the a lock open request needs to be initiated via the user interface of the phone 104 without physically interacting with the lock (e.g., while being inside a car or while being inside a house when the foregoing system is installed to operate a garage or another remote door for example). Alternatively or in addition, the graphical representation and/or animation of the icon 908 may change with the change in the open status.

Figure 11:
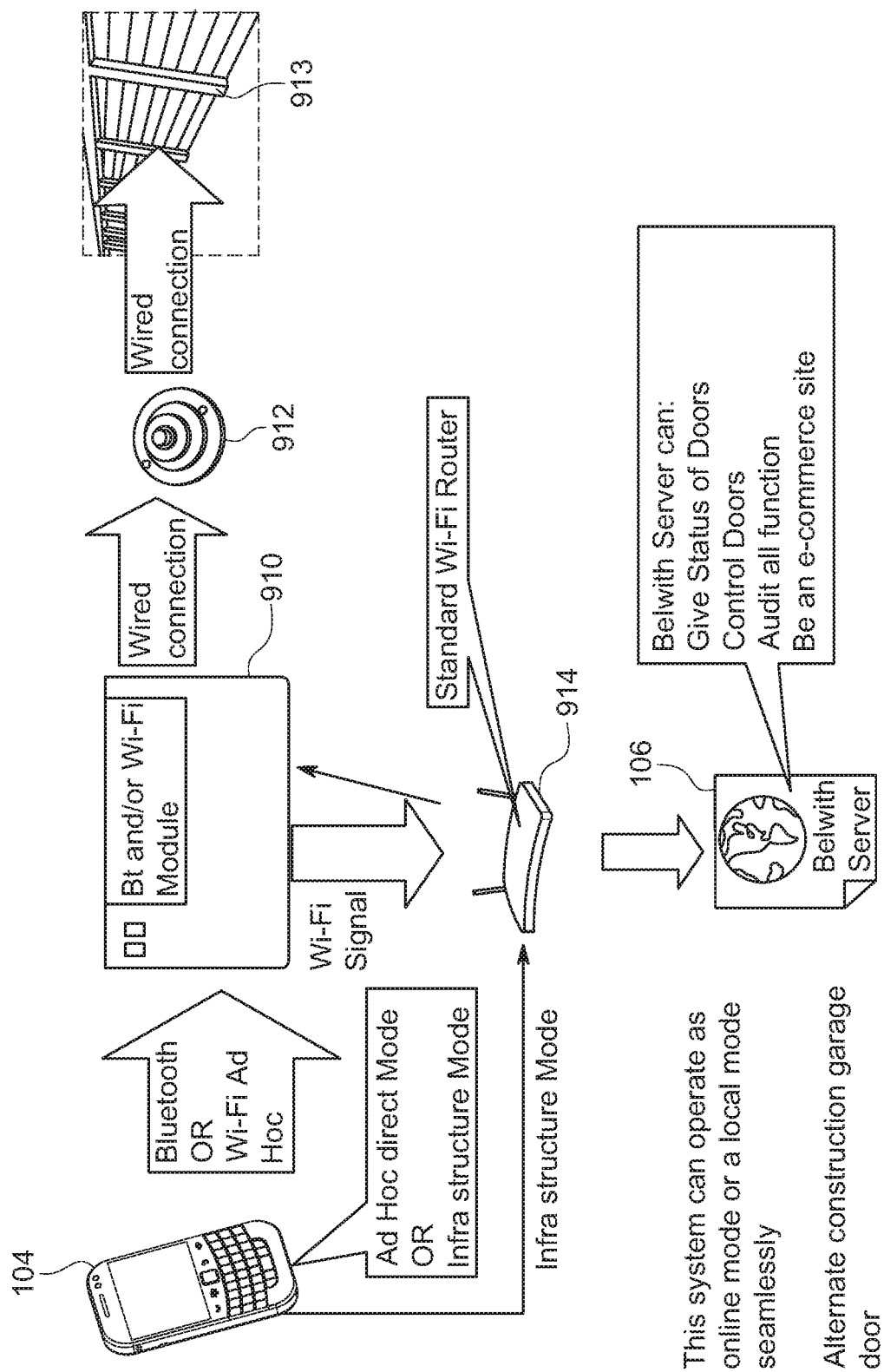
FIGS. 11-15 are schematic diagrams illustrating respective embodiments of a wireless device enabled locking system.
Figure 12:
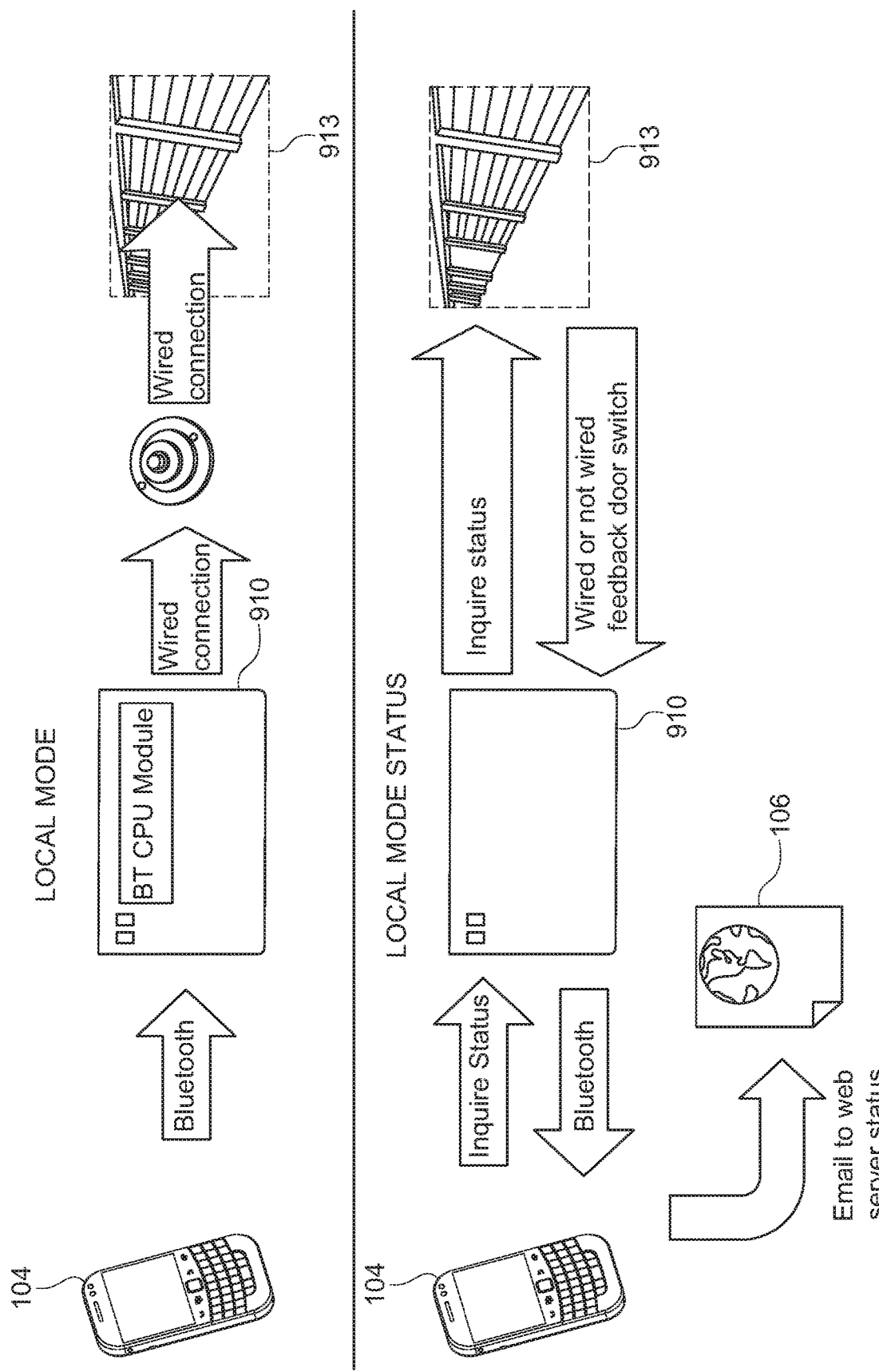
Figure 13:
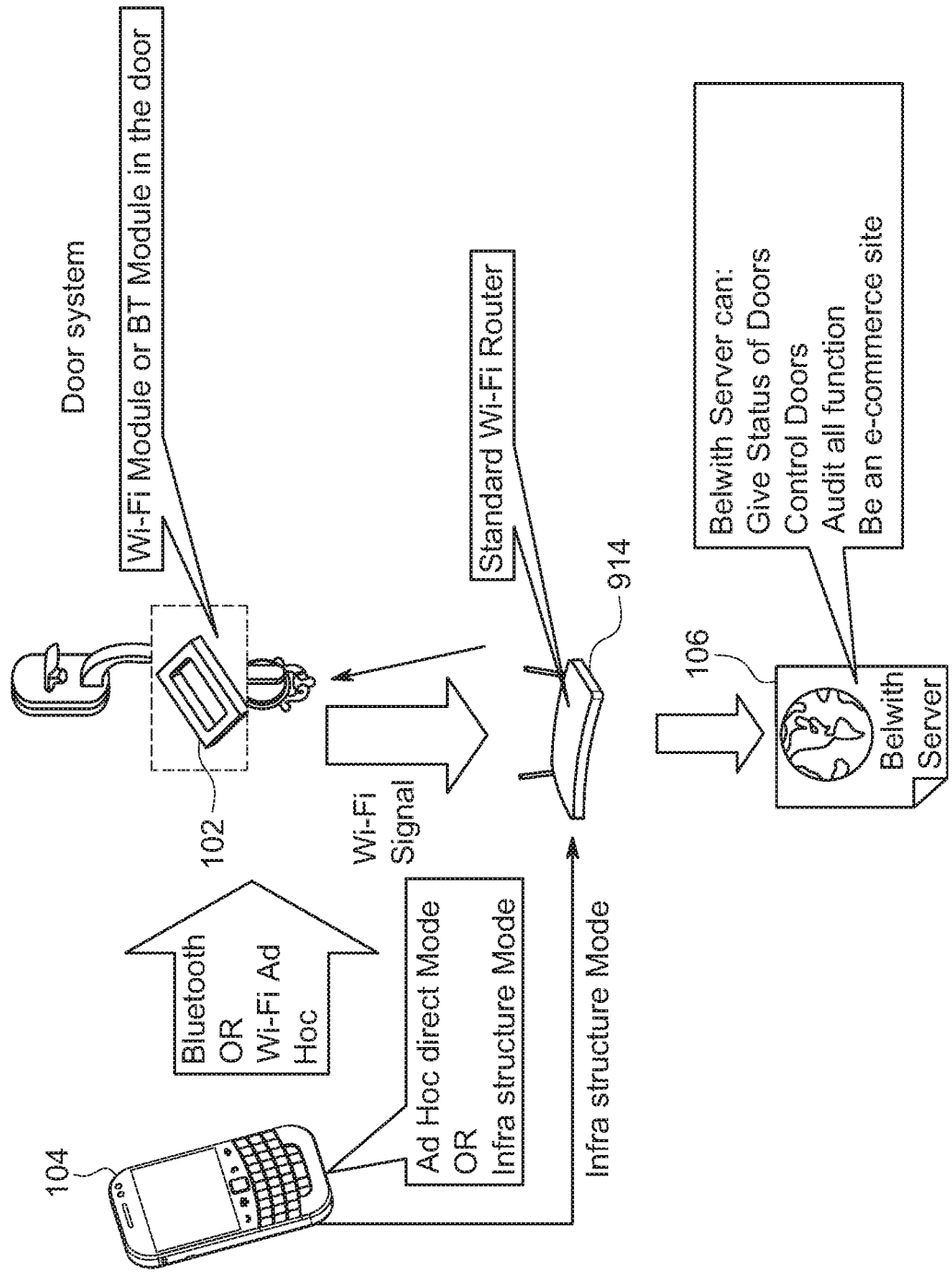

Turning to FIGS. 11-13, alternate embodiments of the wireless locking system described above are shown. For instance, in FIGS. 11-12, an embodiment of the system in accordance with the invention is shown in connection with operating a garage door 913. In the illustrated embodiment, the system has two Modes of operation—an Online Mode of operation and a Local Mode of operation. The Online Mode (FIG. 11) of operation allows cloud/Internet based communication between the mobile device 104 and garage door opener transceiver module 910 (connected to the garage door switch 912 actuating existing garage door equipment) utilizing the encryption scheme via the web portal 106 as described above in connection with FIGS. 1-8. In an embodiment, the mobile device 104 and the garage door opener transceiver module 910 are interconnected via Bluetooth and/or Wi-Fi, where a system further includes a Wi-Fi Router 914 for relaying the authentication signaling to the web portal 106 (e.g., as an alternative for the mobile device 104 communicating with the web portal 106 via a wide area wireless network). The other Mode of operation is called Local (FIG. 12) and relies on a peer to peer (P2P) wireless network (e.g., encrypted Bluetooth or WiFi) communication between the mobile and the transceiver module 910. In the Local Mode of operation, the mobile device 104 communicates with the Web Portal 106 via a wide area wireless network. Preferably, the communication device 104 can use either Mode of operation, such as when all users of multiple mobile devices having access to the system are assigned the same Mode of operation or when a subset of users is assigned a Local or alternately an Online user status. The system thus has a third Mode wherein either the system may operate in the Local mode or the Online Mode. The Online and Local device and/or user statuses can be intermixed in the same communication network. In an embodiment, the mobile device 104 presents the user with a door open/close status interface screen, such as that shown in FIG. 10 above. FIG. 13 shows an alternate embodiment of FIG. 11 where a communication and control module 102 controls a regular door lock and the system employs a Wi-Fi router 914 for relaying the authentication messaging described above in connection with FIGS. 1-8 to the web portal 106.

Figure 14:
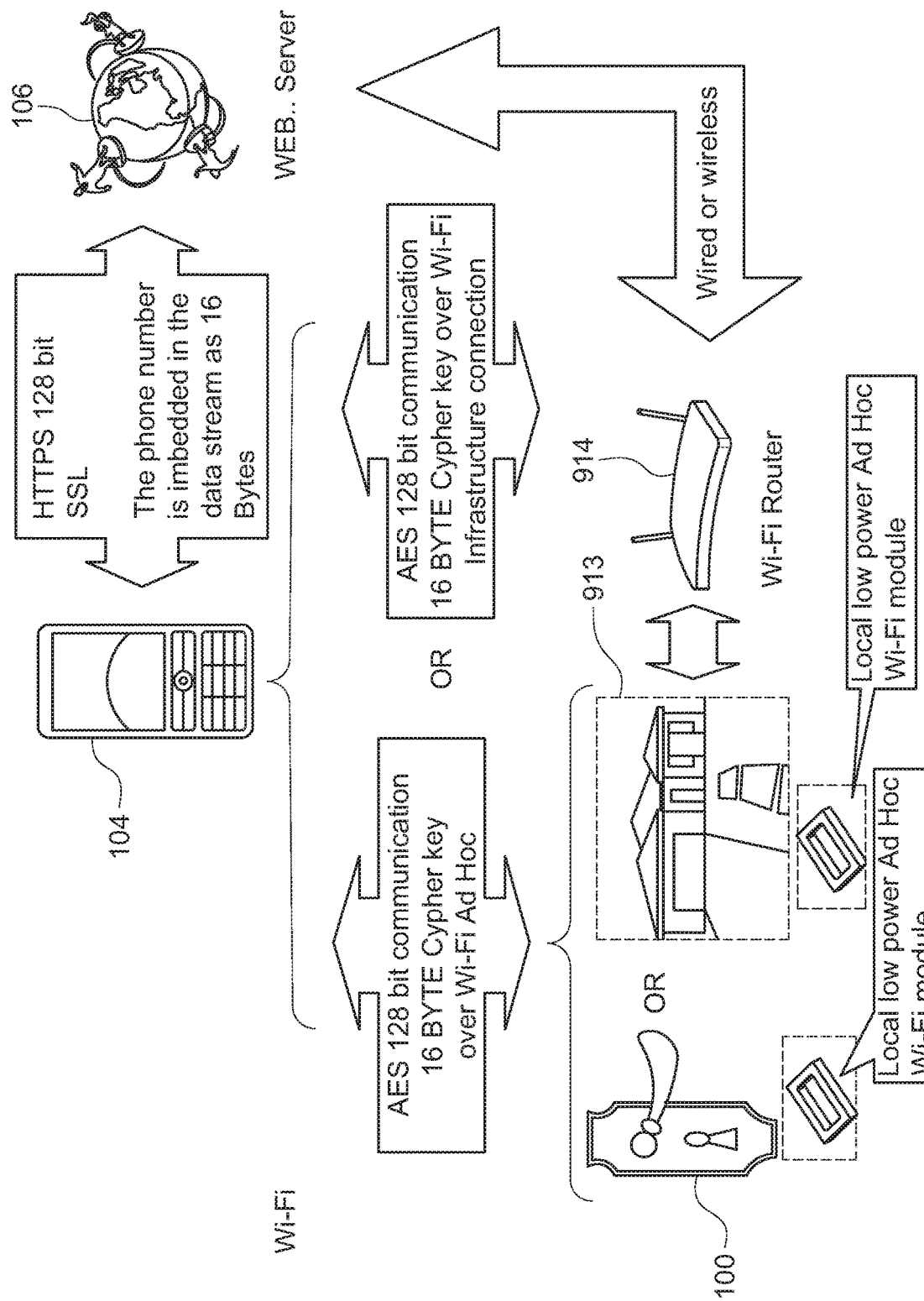
Figure 15:
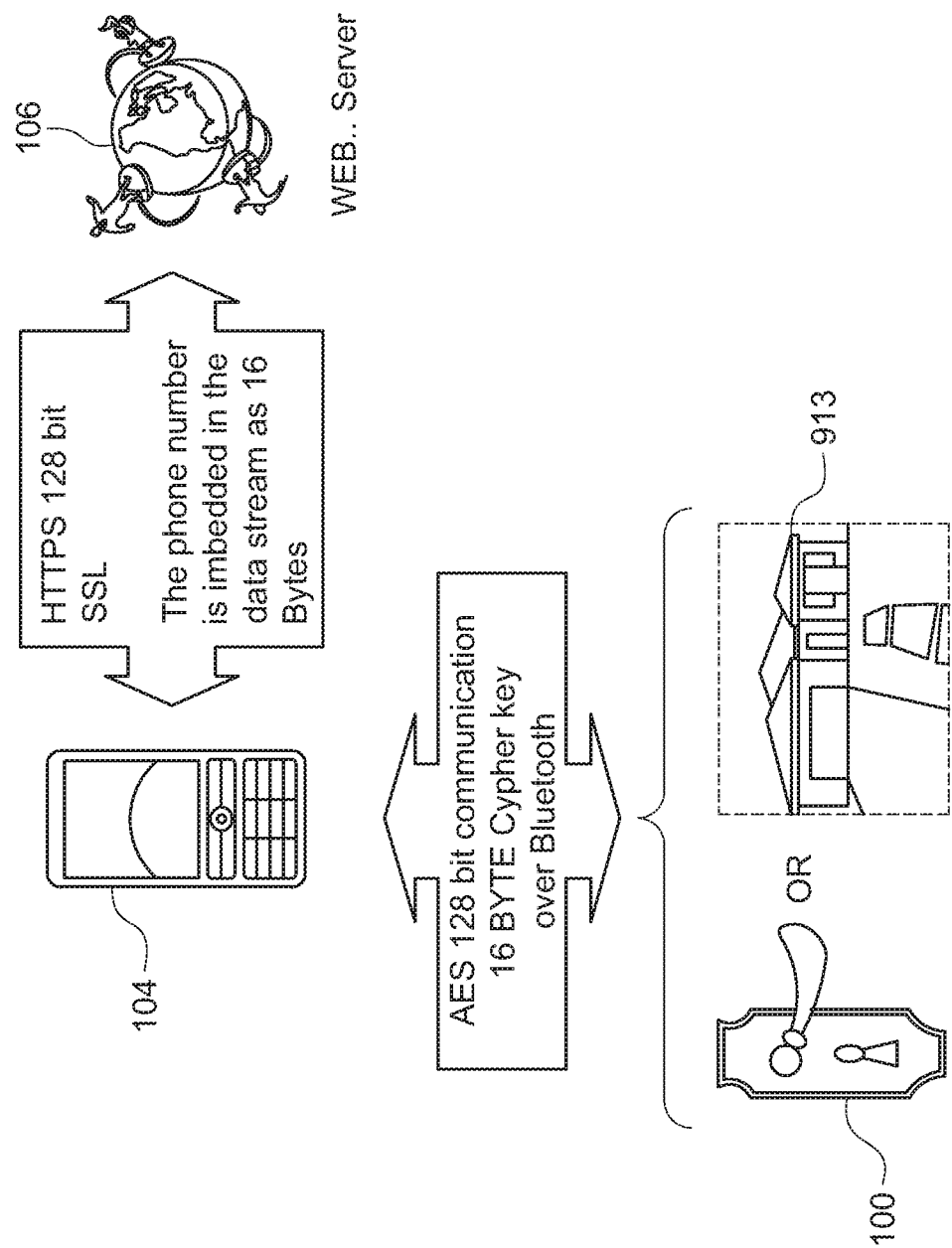

Turning to FIGS. 14-15 illustrate an embodiment of an implementation of the wireless access system of FIGS. 1-13 above where the mobile device or phone 104 communicates with the web portal 106 via HTTPS protocol using 128 bit SSL message security. The mobile device's phone number is embedded in the data stream utilizing 16 bytes. As shown in FIG. 14, in case of Wi-Fi communication between the mobile device 104 and lock 100 and/or garage door 913, the Wi-Fi messaging is encrypted via AES 128 bit encryption with 16 byte cipher key over Ad Hoc or Infrastructure Wi-Fi communication network. In FIG. 15, in case of Bluetooth communication between the lock 100 and/or garage door 913 AES 128 bit message encryption with 16 byte cipher key may likewise be used.

Figure 16:
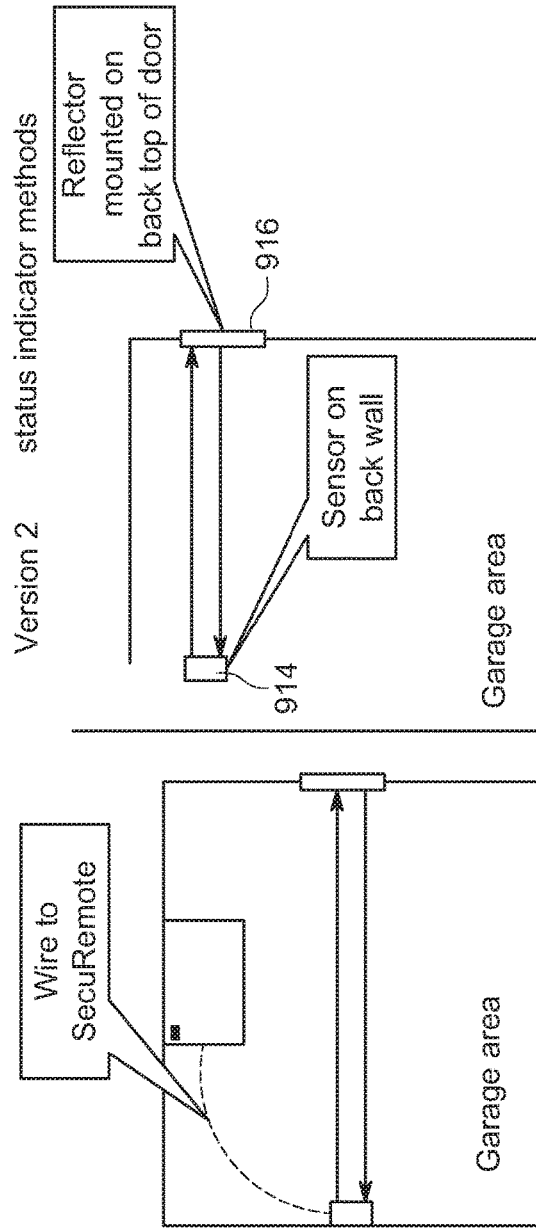
FIGS. 16-17 are schematic diagrams illustrating respective embodiments of a door status sensor for communicating a door open/close status signal to a user interface of a mobile device.
Figure 17:
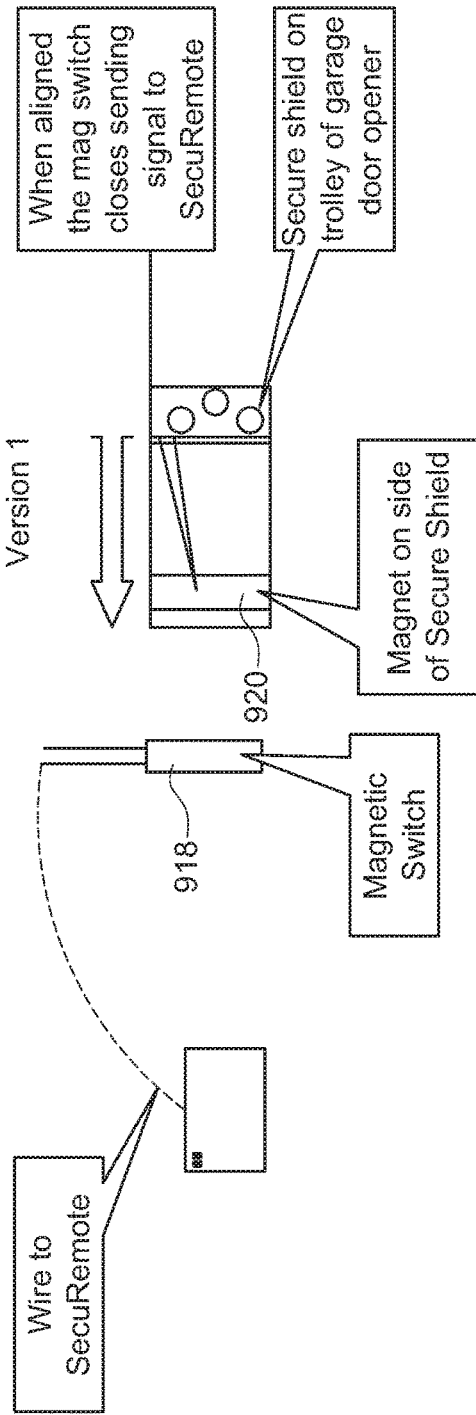

Turning to FIGS. 16-17 illustrate embodiments of a door status sensor for sending a door open/close status signal to the user interface of the mobile device 104. In FIG. 14, an infrared, optical, or a similar type of wireless sensor (e.g., an optical sensor/reflector pair 914, 916) is used to detect the door status, such as the status of a garage door. In FIG. 15, a magnetic sensor 918, 920 is used to detect door closure when the magnetic switch 918 is aligned with the magnet 920 on the door.

Figure 18:
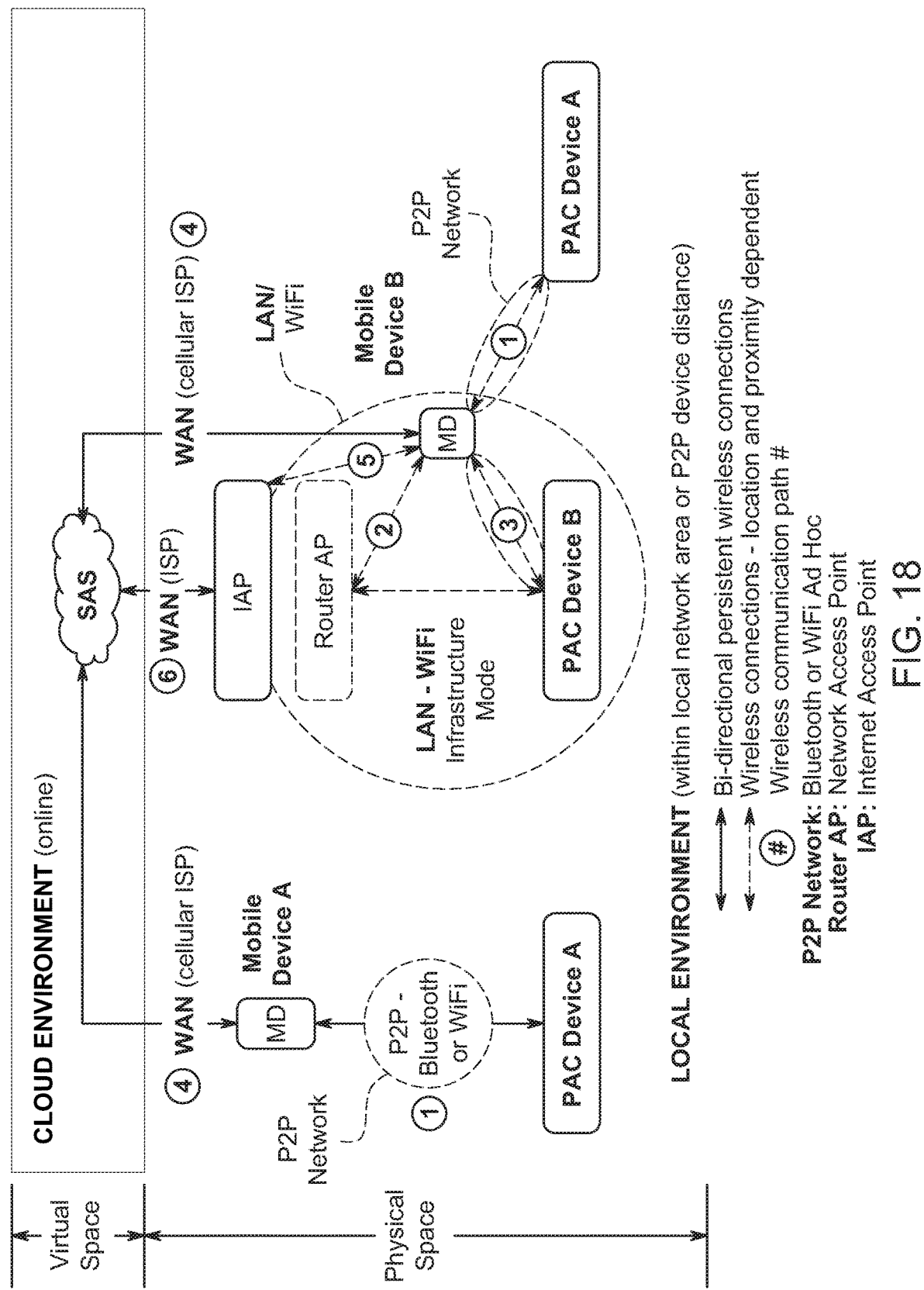
FIG. 18 is a schematic diagram showing various embodiments of the system operating in a Local Mode and in an Online Mode.
Figure 19:
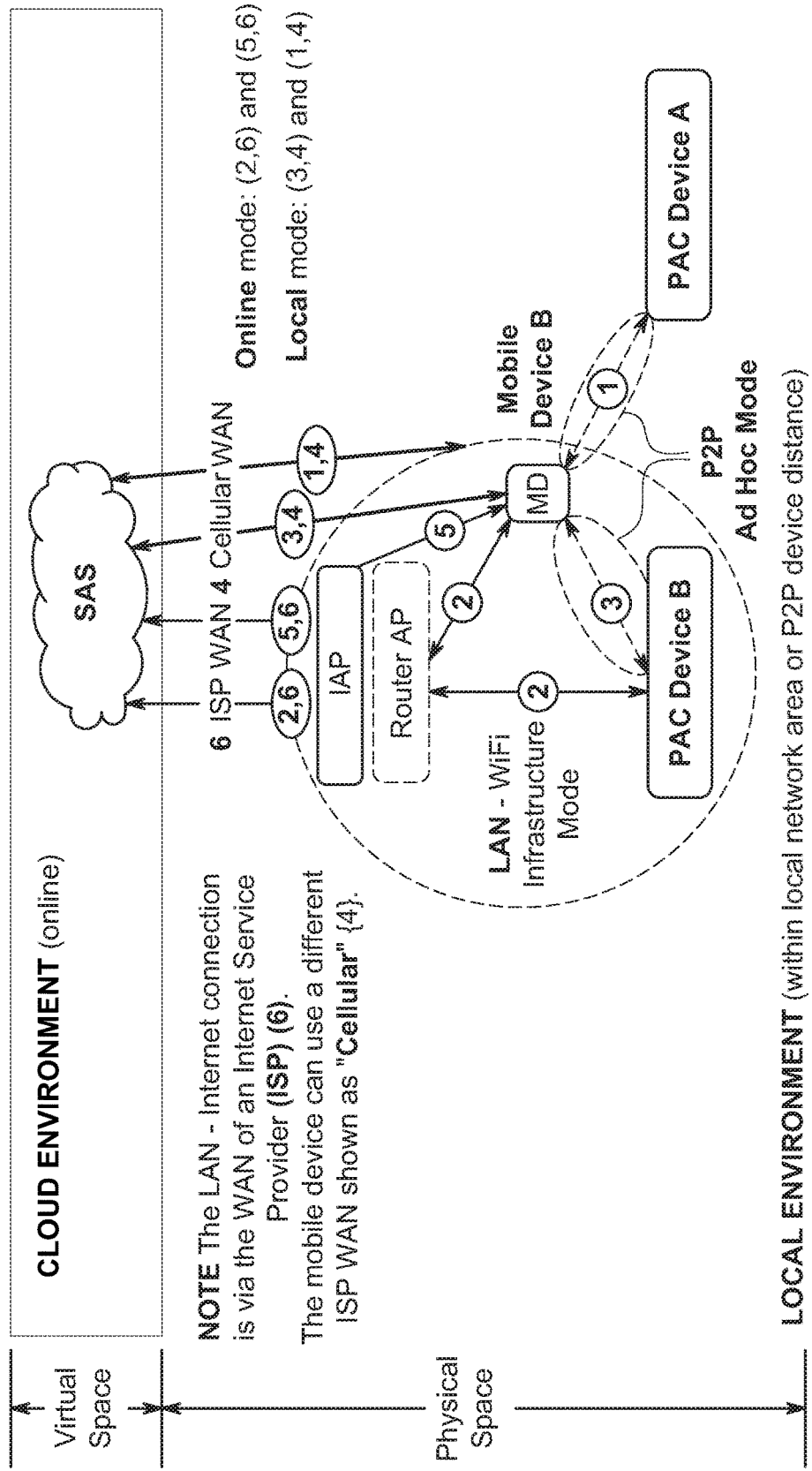
FIG. 19 is the schematic of FIG. 18 showing the resulting paths for Online Mode of operation and Local Mode of operation.

Turning to FIGS. 18-20, various embodiments of the Local and Online Modes of operation defined by the particular communication paths (i.e., paths 1-6) that interconnect the mobile device, the SAS and the Physical Access Control (PAC) device are shown. A communication path is a communication link enabled between at least two communication nodes. A communication node is a communication device or equipment located at either a signal destination point or a signal transmission point (or both) of a particular communication link. The system depicted in FIGS. 18 and 19 has various signal destination and signal transmission point equipment with some of these equipment defined as Major System Components (MSCs). The MSCs of the system described in this disclosure are the PAC (Physical Access Control) Devices, the Mobile Devices, and the Security Authentication Server. It is the particular interconnections of the MSCs via certain communication paths that determine the Mode of operation (i.e., Local or Online) for these particular MSCs of the system. The system—at different times—may thus operate in Local Mode, in Online Mode or in both Modes. Further, the system may seamlessly switch between different Modes of operation at different times depending on the availability of various communication paths.

FIG. 18 depicts the different operating scenarios in terms of how the MSCs are interconnected via communication paths enabled by different wireless networks (peer to peer, LAN-WiFi and WAN). FIG. 19 identifies particular combinations of communication paths for Online and Local Modes of operation. FIG. 20 is a table that categorizes the interconnections shown in FIGS. 18 and 19 into three different operating scenarios. FIG. 20 identifies the communication paths between the MSC and the corresponding Modes of operation.

In Scenario 1 (depicted in FIG. 18 and described in FIG. 20), PAC Device A is shown wirelessly connected to Mobile Device A both of which are located outside the ambit of the LAN-WiFi (WiFi Local Area Network not available) shown. The LAN-WiFi ultimately connects to the SAS via the Internet (Internet Service Provider Wide Area Network or ISP WAN). The Router AP (Access Point) is bridged (i.e., connected) to the IAP (Internet Access Point), which provides access to the Internet (ISP WAN); thus the WiFi LAN provides access to the Internet—viz., it enables an Online connection providing access to the Web Portal of the SAS. In scenario 1 no LAN-WiFi is available. Continuing with scenario 1, PAC Device A and Mobile Device A communicate via communication path 1 enabled by a peer to peer (P2P) wireless network (e.g., either WiFI or Bluetooth). Mobile Device A communicates to the SAS via communication path 4 using a Wide Area Network (cellular WAN) provided by a cellular Internet Service Provider (ISP). Thus scenario 1 describes Local Mode operation as shown in the Table of FIG. 19. It should be noted that for Local Mode operation to exist, the communication path between the Mobile device (A or B, for example) and the PAC Device (A or B) is a communication path (e.g., communication paths 1 and 3) enabled by a P2P wireless network; see FIGS. 18-20.

For Online operation either one of the following two conditions exists: (i) the communication path between a Mobile device and a PAC device includes communication path 2, which is enabled by a WiFi LAN network available to the Mobile Device and the PAC device; and (ii) the communication path between the PAC Device and the SAS is enabled by a WiFi/LAN communication path 2 to Router Access Point (AP) used as a bridge to connect to an IAP (Internet Access Point) to the Internet and ultimately to the SAS. In short, for Online Mode operation to exist, the availability of a LAN-WiFi to either a Mobile Device or a PAC device is required. As shown in FIG. 19 and described in FIG. 20, Mobile Device B and PAC Device B may operate in the Online Mode. PAC Device A and Mobile Device A may not operate in Online Mode because they are outside the ambit of a LAN-WiFi network.

In scenario 2, (depicted in FIG. 19 and described in FIG. 20) even though a LAN-WiFi wireless network is available, a peer to peer connection via communication path 1 between PAC Device A and Mobile Device B exists. PAC Device A is further connected to the SAS via communication paths 1 and 4. This is a Local Mode of operation that uses communication paths 1 and 4 to provide for communication between the PAC Device A and the SAS.

Additionally, in scenario 2, the PAC Device B communicates with the SAS via communication paths 2 and 6 enabled by the LAN-WiFi and the ISP WAN. PAC device B may communicate with Mobile Device B via communication paths 2; this is an Online Mode of operation. Further, even though Mobile Device B communicates to the PAC device B via communication path 3, the PAC device may communicate with the SAS directly via paths 2 and 6; this also an Online Mode of operation. Thus, scenario 2 provides both Local and Online Modes of operation.

In scenario 3, PAC Device B and Mobile Device B are within the ambit of the LAN-WiFi. PAC device A is located outside the ambit of the LAN-WiFi, (i.e., a wireless network) but may be located within the range of a P2P network to enable communication path 1 as shown; this would be a Local Mode of operation. PAC device B may also be physically located a certain distance within the range of a P2P wireless network to enable communication path 3. Mobile Device B would be connected to the SAS via communication path 4 or communication paths 5 and 6. This would also be a Local Mode of operation between Mobile Device B and PAC device B.

However, communication path 3 may no longer be enabled if Mobile Device B changes its location so that it is outside of the range of operation of the P2P wireless network that is enabling communication path 3. In such a case, the system may provide automatically a new wireless connection between Mobile Device B and PAC Device B via communication path 2 (or other available communication path) and connect PAC Device B to the SAS via communication paths 2 and 6. PAC Device B and Mobile device B would thus seamlessly switch from a Local Mode of operation to an Online Mode of operation. The system of the present disclosure may, thus, switch from one Mode of operation to another Mode of operation for various MSCs in a seamless fashion depending on the availability of communication paths and MSCs. The system automatically assigns new communication paths to different MSCs as needed to maintain operation in either Local Mode or Online Mode or to switch operation between Local Mode and Online Mode as needed.

For the system of the present disclosure to perform an operation in either the Local Mode or the Online Mode, at least one of two conditions are met: (1) the mobile device is in physical proximity of the PAC device (to communicate via a P2P network) and also have Internet connectivity (via cellular WAN or via WiFi Infrastructure mode Router to the Internet via an IAP), or, (2) The PAC device must have Internet connectivity (through an Internet Access Point to be operated from the SAS web browser (via computer or internet-enabled mobile device). Note WiFi Infrastructure Mode network and LAN-WiFi network are used interchangeably.

The MSCs of the system of the present disclosure are interconnected to each other via different types of communication networks that comply with different communication protocols (i.e., communication protocols). The particular combination of interconnections determine whether the system is in Local or Online Mode of operation for different MSCs.

I. Local Mode of Operation

The Local Mode is based on short-range wireless networks such as P2P, Ad Hoc, and PANs that a mobile (or communication device) can use to establish a wireless connection with a PAC, and which mobile device is Internet-enabled through cellular WAN that allows it to communicate with the SAS and to authenticate a PAC operation.

The Local Mode can be practiced in either of the protocols specified by IEEE 802.11; see https://en.wikipedia.org/wiki/IEEE 802, viz., Bluetooth personal area network (PAN) mode, or Infrastructure WiFi mode; see (https://arxiv.org/ftp/arxiv/papers/1307/1307.2661.pdf Still referring to FIG. 18, PAC device A is shown connected to Mobile Device A via communication path 1 enabled by a Peer to Peer (P2P) wireless network two examples of which are Bluetooth and WiFi.

A. Peer-to-Peer (P2P) Wireless Networks

P2P wireless communication networks allow applications to connect to nearby devices without the need to connect to an infrastructure network or hotspot (i.e., Infrastructure Mode network or LAN-WiFi network). P2P networks can be formed using either Bluetooth or WiFi. The advantages of these networks are (i) low power usage due to short communication range, and (ii) quick and automatic connection response because of pairing, and the direct information flow from one device to the other which in turn allows control of the flow and whether data is saved or retained; See Peer-to-Peer (P2P) Networks using Bluetooth and WiFi; https://www.mobileprocessing.org/p2p.html.

P2P networks can co-exist with wireless WANs (such as cellular/mobile carrier networks) and can complement each other. For instance, if a mobile device uses P2P to connect to and operate a PAC device because at the time it does not have WAN connectivity, it can update an online database (i.e. that of the SAS) as soon as a cellular network becomes available. WiFi and Bluetooth can coexist in handheld devices (PDF); https://www.marvell.com/wireless/assets/Marvell-WiFi-Bluetooth- WiFi Direct is an emerging P2P networking standard where each device can serve as the WiFi access point of the network. Wi-Fi Direct was launched in October 2010. Another mode of direct communication over Wi-Fi is Tunneled Direct Link Setup (TDLS), which enables two devices on the same Wi-Fi network to communicate directly, instead of via the access point.

1. Peer-to-Peer (ad hoc)

A peer-to-peer wireless communication network allows wireless devices to directly communicate with each other. Wireless devices within range of each other can discover and communicate directly without involving central access points; https://en.wikipedia.org/wiki/Peer-to-peer. This method is typically used by two computers so that they can connect to each other to form a network. This can basically occur in devices within a closed range.

An ad hoc network; https://en.wikipedia.org/wiki/Wireless_ad_hoc_network (not the same as a WiFi Direct network[3]; https://en.wikipedia.org/wiki/Wi-Fi_Direct) is a network where stations communicate only peer to peer (P2P). There is no base and no one gives permission to talk. This is accomplished using the Independent Basic Service Set (IBSS).

A WiFi Direct network is another type of network where stations communicate peer to peer. In a Wi-Fi P2P group, the group owner operates as an access point and all other devices are clients. There are two main methods to establish a group owner in the Wi-Fi Direct group. In one approach, the user sets up a P2P group owner manually. This method is also known as Autonomous Group Owner (autonomous GO). In the second method, also called negotiation-based group creation, two devices compete based on the group owner intent value. The device with higher intent value becomes a group owner and the second device becomes a client. Group owner intent value can depend on whether the wireless device performs a cross-connection between an infrastructure LAN-WiFi service and a P2P group, remaining power in the wireless device, whether the wireless device is already a group owner in another group and/or a received signal strength of the first wireless device.

2. Ad Hoc Wireless Networks

A wireless ad hoc network (WANET) is a type of on-demand, device-to-device network. An ad hoc network connects directly to other devices without a server. The communication between two devices is direct, meaning one-to-one, or peer-to-peer (P2P). In ad hoc mode a user can set up a wireless connection directly to another without having to connect to a Wi-Fi access point or router. There is no central management hub where all devices can be controlled.

Due to the nature of an ad hoc connection not needing an existing infrastructure to sustain the network, it is entirely decentralized and is considered a peer-to-peer network. See the following for Definitions: What Is an Ad Hoc Wireless Network?—https://www.lifewire.com/what-is-an-ad-hocwireless-network-2377409; A Guide to Ad-Hoc Mode in Networking—https://www.lifewire.com/ad-hoc-mode-in-wireless-networking-816560.

Peer-to-peer connections join devices when routers or servers are not available. Ad-hoc networks are local area networks that are also known as P2P wireless networks because the devices communicate directly, without relying on servers. Like other P2P configurations, ad-hoc networks tend to feature a small group of devices all in very close proximity to each other. Because ad-hoc networks require minimal configuration and can be deployed quickly, they make sense when there is a need to form a small—usually temporary—cheap, all-wireless LAN. They also work well as a temporary fallback mechanism if equipment for an infrastructure mode network fails; https://www.lifewire-.com/infrastructure-mode-in-wireless-networking-816539.

3. Other Types of Wireless Ad Hoc Networks

There are several types of Wireless Ad Hoc Networks categorized into different classes—the most relevant ones are:

Mobile ad hoc network (MANET): An ad hoc network of mobile devices; https://www.lifewire.com/what-is-a-mobile-device-2373355.

Smartphone ad hoc network (SPAN): Wireless ad hoc network created on smartphones via existing technologies like Wi-Fi and Bluetooth; https://www.lifewire.com/what-is-bluetooth-2377412.

Wireless mesh network: A mesh network; https://www.lifewire.com/mesh-network-4175202—is an ad hoc network where the various nodes are in communication directly with each other to relay information throughout the total network.

Wireless sensor network: Wireless sensors that collect everything from temperature and pressure readings to noise and humidity levels, can form an ad hoc network to deliver information to a home base without needing to connect directly to it.

WiFi Ad Hoc (peer-to-peer) Mode. In ad hoc mode, mobile units transmit and communicate directly with other devices peer-to-peer (P2P). This is accomplished using the Independent Basic Service Set (MSS).

4. Personal Access Network (PAN)

A "Personal Access Network" or "Personal Area Network" (PAN) network is a type of an Ad Hoc network intended to connect devices within a short distance of a user (hence the "personal"). A PAN provides data transmission among devices such as computers, smartphones, tablets and personal digital assistants. PANs can be wired, such as USB or FireWire, or they can be wireless, such as infrared, ZigBee, Bluetooth and ultrawideband (UWB). One of those connected devices could link to an external network, to access the Internet—as is the case when one such connected device is a mobile device with permanent internet connectivity.

A Bluetooth PAN is a short-range ad hoc wireless network of Bluetooth-enabled devices. It is ad hoc because such devices do not connect through a router or central hub of any sort. Rather, they connect directly to each other.

As a rule, joining Bluetooth devices to a Bluetooth network is a simple matter as most of the action takes place automatically, behind the scenes. See Bluetooth PAN; https://itstillworks.com/12442081/how-to-connect-an-iphone-to-bluetooth-pan 5. A Personal Area Network (Computer)

PAN, is also a computer network that enables communication between computer devices near a person; See https://urgentcomm.com/2007/11/01/connecting-on-a-personal-level/

PANs can be wired, such as USB or FireWire, or they can be wireless. A wireless personal area network (WPAN) is a PAN carried over a low-powered, short-distance wireless network technology such as IrDA, Wireless USB, Bluetooth or ZigBee. The reach of a WPAN varies from a few centimeters to a few meters; see https://en.wikipedia.org/wiki/Wireless_USB; https://en.wikipedia.org/wiki/Infrared_Data_Association; https://en.wikipedia.org/wikiBluetooth; and https://en.wikipedia.org/wiki/Zigbee.

The range of a PAN typically is a few meters. Examples of wireless PAN, or WPAN, devices include cell phone headsets, wireless keyboards, wireless mice, printers, bar code scanners and game consoles. Wireless PANs feature battery-operated devices that draw very little current.

The terms PAN and ad-hoc Network are not necessarily interchangeable; See Are the "PAN" (Personal Access Network)" and "ad-hoc network" interchangeable terms?; see https://superuser.com/questions/107817/are-pan-personal-area-network-and-ad-hoc-network-two-terms-for-the-same-th When searching the Internet, it may seem that the terms "ad-hoc network" and "personal area network" (PAN) are sometimes used interchangeably. However, that is not the case. A PAN is typically an ad hoc network, but the terms are not interchangeable.

A PAN is differentiated by range, typically up to a few meters. It is intended to connect devices within a short distance of a user (hence the "personal"). One of those connected devices could link to an external network, to access the Internet—as is the case when one such connected device is a mobile device with interne connectivity.

An ad hoc network is one that is created as or when needed for a purpose by the devices, themselves, rather than connecting the devices via a network infrastructure, like a router.

6. Wireless Personal Area Network see https://en.wikipedia.org/wiki/Personal_area_network A wireless personal area network (WPAN) is a personal area network (PAN) in which the connections are wireless. IEEE 802.15; see https://en.wikipedia.org/wiki/IEEE_802.15 has produced standards for several types of PANs operating in the ISM band including Bluetooth. See https://en.wikipedia.org/wiki/IEEE_802.15; and https://en.wikipedia.org/wiki/ISM_band; https://en.wikipedia.org/wiki/Bluetooth.

Bluetooth; see https://en.wikipedia.org/wiki/—Bluetooth uses short-range radio waves. Uses in a WPAN include, for example, Bluetooth devices such as keyboards, pointing devices, audio headsets, printers may connect to personal digital assistants (PDAs); https://en.wikipedia.org/wiki/Personal_digital_assistant, cell phones; https://en.wikipedia.org/wiki/Mobile_phone, or computers. A Bluetooth WPAN is also called a piconet, and is composed of up to 8 active devices in a master-slave relationship (a very large number of additional devices can be connected in "parked" mode). The first Bluetooth device in the piconet is the master, and all other devices are slaves that communicate with the master. A piconet typically has a range of 10 meters (33 ft), although ranges of up to 100 meters (330 ft) can be reached under ideal circumstances. Long-range Bluetooth routers with augmented antenna arrays connect Bluetooth devices up to 1,000 feet.[2], see https://en.wikipedia.org/wiki/Personal_area_network#cite_note-2

7. Bluetooth Mesh Networks

With Bluetooth mesh networking the range and number of devices is extended by using mesh networking techniques to relay information from one node of the network to another. Such a network doesn't have a master device and may or may not be treated as a WPAN.[3]; see https://en.wikipedia.org/wiki/Bluetooth_mesh_networking; https://en.wikipedia.org/wiki/Mesh_networking; https://en.wikipedia.org/wiki/Personal_area_network#cite_note-3

II. Online Mode of Operation

The Online mode relies on WiFi infrastructure mode which includes a LAN (Local Area Network) Router and either a LAN Access Point (AP) or Internet Access Point (IAP) and/or an internet-enabled Mobile Device whereby:

PAC communicates with SAS directly via LAN/Router and Internet Access Point (IAP)—this is a persistent Internet connection. For example, in FIG. 18 of the present disclosure, PAC Device B communicates with the SAS via communication paths 2 and 6 which include the Router AP and the IAP. Therefore, PAC can be operated from SAS directly from its browser from any internet-enabled computer or Mobile device.

PAC Device B may also communicate with the SAS indirectly by connecting to a Mobile device B through a peer to peer network and then through the Mobil device's internet connection (cellular WAN). In FIG. 18, for example, PAC Device B communicates with Mobile Device B via LAN-WiFi (i.e., communication path 2) and the Mobile Device B communicates with the SAS via communication path 4 using the Wide Area Network (WAN) (cellular ISP). When the Mobile Device is not Internet enabled, it may connect to the SAS via the LAN-WiFi IAP (Internet Access Point) and the WAN (ISP or Internet Service Provider) (i.e., communication paths 5 and 6). It is noted that the Online Mode is an alternative to a Mobile Device communicating to SAS over a Wireless Wide Area Network (WAN), i.e., via a cellular network.

A. Wireless Wide Area Networks (WWAN)

These networks deliver data in the form of telephone calls, web pages, and streaming video. "Wide Area" or "Cellular" is a general term in that these networks can be variants of different sizes. WWAN technology is what mobile devices, stationary internet routers, or internet access point devices (IAP) use for internet connectivity provided by Internet Service Providers (ISPs). The technology uses a variety of communication protocols (see References below) and has been continually evolving. Connectivity with SAS is achieved via the HTTPS (HyperText Transfer Protocol Secure) interface protocol.

III. Major System Components

While the various MSCs (i.e., PAC Devices, Mobile Devices, and the SAS) operate in the Modes of operation discussed above, each of them is involved to a certain extent in performing at least one Major system function. The three major system functions are (i) Administrative Management, (ii) Operation of PAC devices and Mobile Apps, and (iii) Monitoring and Reporting. It should be noted that the Operation of PAC devices/Mobile Apps function can be configured to operate in any one of three Modes of Operation (Online, Local and Local or Online) without affecting the Administrative Management function. All three of the Major System functions are subjected to SAS authentication and authorization for each user and PAC device.

The SAS is available online and accessible by any Internet-enabled device (mobile or other) via a browser. The SAS authenticates and authorizes mobile and PAC devices in order to perform an operation. The SAS can create a set of users configured to operate a PAC device in any one of the three modes of operation (i) Online mode only; (ii) Local mode only or (iii) either Online or Local mode.

A Mobile device may be Internet-enabled regardless of location. Alternatively, the Mobile device may not be internet-enabled but capable of accessing a LAN Internet Access Point near the premises of a PAC and thus operate in an Online mode. An administrator can use a mobile or other internet-enabled device to access/use the SAS from anywhere subject to authorization access rights. Authorization access rights pertain to a device or owner of a device having registered and accepted as having certain rights or capabilities to operate the PAC device via the SAS. The Mobile can be configured to operate in either one of the two communication modes—the Internet and a LAN Internet Access Point.

The role of the PAC device is relatively more device specific than the other MSCs. It performs its role in either Local mode or Online mode. The PAC device does not use SAS functionality. It executes an operation subject to the SAS authentication an authorization process. The PAC device can be configured, however, to operate in any one of the three modes of operation, viz., the Online mode only, the Local mode only or either of the two modes.

IV. Major System Functions

A. Administrative Management

1. Security Authentication Server

Administrative Management is primarily for system Administrators and secondarily for system users both of whom can be referred to as "registered users" or "system users." Typical capabilities of administrative management include setup/configuration of devices (i.e. commissioning a device in the field), adding/registering users, and assigning/authorizing access rights to specific users and devices or groups thereof. Administrative Management and control provides secured access with simplified functionality, and administrator control from any web terminal using a form of SSL security. The SAS is available always in Online Mode of operation to manage all system PAC devices and users (i.e., user Mobile Devices). The SAS is the only Major System Component (MSC) that is available online (as long as Internet connectivity exists) for any device, which is Internet connection enabled. Administrative management is possible via HTTP web browser interface. The SAS authenticates and authorizes PAC operations.

2. Mobile Device

Mobile devices (or communication devices) are intended as user devices with no (or limited) administrative management functionality in order to enable the operation of PAC devices and may or may not have internet connectivity at all times.

3. PAC Devices

PAC devices have limited and specific functionality to performing an access control operation (i.e. lock/unlock) and reporting/confirming the status at the time of operation.

B. Operation of PAC Devices and Mobile Apps

1. Security Authentication Server

The SAS provides access and operation of access control devices by authorized system users who can accomplish such system access and operation (i.e. lock/unlock depending on date/time/schedule aces rights), by using their mobile App on their mobile device and/or by using the SAS web portal.

Such access and operation by a user can be accomplished within local proximity of an access control device defined as within the wireless short range of a local area network (such as Bluetooth, Wi-Fi, Zigbee, Z-wave, or the like) and defined as "local mode" or remotely by using the wide area network of a mobile device or internet connection defined as "online mode." An Operation for a PAC device is authenticated and authorized by the SAS and executed by the authorized PAC device. SAS is the only MSC that is always available online for any device which is internet connection-enabled. Administrative management is possible via HTTP web browser interface. Authenticates and authorizes PAC operations. SAS is the only MSC that is always available online for any device which is internet connection-enabled. Administrative management is possible via HTTP web browser interface. Authenticates and authorizes PAC operations.

2. Mobile Device

Mobile devices (or communication devices) are intended as user devices with no (or limited) administrative management functionality in order to enable the operation of PAC devices and may or may not have internet connectivity at all times. A Mobile device may operate a PAC device in Online mode or Local mode Mobile devices (or communication devices) are intended as user devices with no (or limited) administrative management functionality in order to enable the operation of PAC devices and may or may not have internet connectivity at all times.

3. PAC Devices

PAC devices have limited and specific functionality to perform an access control operation (i.e. lock/unlock) and reporting/confirming the status at the time of operation. The operation of the PAC device is the method by which it performs its function (i.e. lock/unlock or open/close a garage door) which starts with communication, authentication, authorization, the resulting physical actuation, and status report.

C. Monitoring & Reporting

1. Security Authentication Server

The SAS is used to Monitoring or reporting device operations, device conditions or operating status (i.e. remaining battery life, "locked/unlocked" status). In addition, Audit Trail reports, see https://www.webopedia.com/TERM/A/audit_trail.html (i.e. historic activity of various system functionality aspects upon an Administrator's or authorized User's request).

2. Mobile Device

A mobile device may initiate PAC operation transactions and status confirmation reports to the SAS.

3. PAC Devices

The Monitoring & Reporting function can be supported by any one of the three modes separately and independently of the PAC device Operation function. That means that the Monitoring & Reporting function can be configured to operate in a different mode than the Operation function. For instance, the Monitoring & Reporting function could be configured to operate in Online mode only whereas the Operation function could be configured to operate in Local mode only.

Turning to FIGS. 21 and 22, the various system functions for each of the MSCs are outlined consistent with the discussion above. The Administrative Management function is hosted and operated by the SAS with administrative access through its web portal. The SAS provides full system management and control capability. The SAS is available online as long there is Internet access available to any Internet enabled device (e.g., mobile devices or other internet enabled devices) via a browser. The SAS enables operation of the PAC device and authenticates and authorizes operational transactions per administrative access rights for PAC devices. The SAS also provides and operates the Monitoring and Reporting function and provides transaction confirmations, reports and notifications to authorized user. The role of the three MSCs are summarized by this table. FIG. 22 shows the role of each major system component as it relates to each major core function of the system. The Monitoring & Reporting function can be supported by any one of the three modes separately and independently of the PAC device operation function. In other words, the Monitoring & Reporting function can be configured to operate in a different mode than the Operation function (i.e., PAC device operation). For instance, the Monitoring & Reporting function could be configured to operate in Online mode if the Operation function (i.e., PAC device operation) could be configured to operate in Online mode only. Similarly, the Administration function is enabled by the SAS web browser and thus is available online (as long as Internet service is available) regardless of the mode of operation of the other two functions.

Overview of Features of Embodiments of the Present Disclosure

As seen in the foregoing Figures, the various embodiments described in this disclosure eliminate the potential for breach in managing many locations across a mobile workforce. It provides an unparalleled level of secured access with simplified management using mobile devices, such as smart phones, tablets, and the like, as remote keys, as well as provides full audit trails and secure data transmission. In particular, the mobile device, such as a phone, contains no security data, and no encryption tables. The phone communicates to the lock through secured Bluetooth and/or Wi-Fi or the like data lines and allows administrator control from any web terminal using a form of SSL security.

In various embodiment, the lock can be configured to operate doors of many types. The phone is used as a communication device (e.g., receives encryption data and converts to Bluetooth and sends signal to lock) and, in embodiments, there are no external routers, computers, or additional Z-wave boxes required. The system operates in peer-to-peer or Ad Hoc modes.

The phone application can run on any suitable platform including, e.g., I-PHONE (iOS), BLACKBERRY, ANDROID, or other mobile operating systems.

Embodiments of the lock components include the following: 1. Latch assembly, motor (actuator), communication board & associated custom driving linkages (Lock); 2. Wire harness; 3. Mounting Hardware; 4. Battery (optional); 5. External battery pack (optional).

Power Requirements:

5 to 24 volts DC;

Current draw 2 AMP max;

Current usage in sleep mode less than 100 mA;

Can be powered with batteries or external battery pack;

Over current protection on all circuitry.

Mechanical Features: (customizable for specific applications):

Three point anti pry locking system;

Two point compression locking to provide seal on door;

The Lock occupies the same or less space in the cabinet than the existing mechanical system;

Permanent magnet motor drive (alternately solenoid actuator);

In-field upgradeable from current mechanical lock to electrical Lock system;

Operating temperature from +120 degrees to −30 degrees;

Automatic locking feature upon door closing (optional).

Electronic features:

Bluetooth/WiFi communication;

Encrypted solid state memory;

Peer to Peer (ad-hoc);

No attack point;

Encrypted access codes;

Web based audit;

Wireless in-field upgrades available via flash memory;

All circuitry is protected from over current, power spikes and power loss recovery.

Access

Unlocking the ISS Lock is performed via data enabled cell phones enabled with wireless applications (Bluetooth or WiFi), coupled with the server solution described herein.

Workflow Overview

The Mobile Security Authentication System consists of the Smartphone Application, our Security Authentication Server (SAS), and the ISS Lock. The system uses an algorithm for random number generation, e.g., a Public Key. The Public key, along with an encryption algorithm, is used to generate the Encryption Key, and return authenticated codes to the application on the phone. The encryption algorithm resides on both the ISS Lock, as well as the Security Authentication System Server, which is a hosted web based platform.

Workflow Specifics

The application prompts the user to enter a LOCK ID when the user launches the application. In an embodiment, the LOCK ID is a string of alpha numeric characters with 32 character max visible on the door. The Lock ID has provision for customization of naming. The application then sends the LOCK ID, Phone Number, and unique phone identifier code (which is retrieved from the phone by the application) as a data message using the cellular network, to the SAS using HTTP protocol with JSON for data serialization. Upon request from the application, the SAS will generate the Public Key and use this to generate the Encryption Key. The SAS then sends both the Public Key and the Encryption Key to the application. Provided the application receives authorization from the SAS, the application will encrypt an "UNLOCK" message via the Encryption Key, and send the message to the ISS Lock in the door. The ISS Lock then decrypts the message using the same algorithm, and operates the lock motor into the "UNLOCK" position.

a. Smartphone Application

As noted above, the mobile device application may run on any suitable platform, including those BLACKBERRY, ANDROID, and IPHONE (iOS) mobile operating systems.

Security Authentication Server (SAS) Overview

The SAS is a web based platform accessible by clients through a browser. It is a central administration area where clients manage access to all the ISS Locks they own. It is a self serve portal for clients. Clients sign into the secure portal for the purpose of maintaining Lock ID/Phone number combinations, time of day access permissions, activation and de-activation of certain phones or Lock IDs.

a. Mobile Application User Interface

When user launches application on mobile device, user identifies which lock they want to have access to and then clicks an "Authenticate" button to send Unlock Request message to selected URL.

a. Unlock Request/Status Message

Unlock request message is send from mobile application to the web portal using HTTP post. The web portal/server authenticates user's request for unlock operation using Lock ID and Phone number information received from this message. The web portal confirms the mobile application is allowed to operate within the requested time limitation set by the Administrator and then sends an Unlock Status message to the mobile application. The Web Server indicates status of this request in an access log.

Mobile application sends Unlock Request/Status message in a following format using HTTP Post:

Type: 1 Character

1 ANDROID

2 IPHONE (iOS)

3 BLACKBERRY (IPHONE/IPOD also sends a UDID information to uniquely identify device using this field to specify type of Mobile where application is running)

Phone #: 11 Characters (Phone Number)

Lock ID: 16 Characters (Lock ID)

Action: 1 Character:

1 Request (Authentication Request)

2 Status (Status of the request)

Status: 1 Character (Only consider if Action is 2):

0 Success

1 Fail (Hardware Issue)

2 Timer Expire (User has not requested unlock operation in given time interval)

3 Invalid message (Message is not correct once decrypted)

4 Cannot communicate to Hardware device

5 Invalid date (Date information received is not matching with encrypted message received)

6 Duplicate Random Number (Received Random Number in a message already used for a given date)

Status code 5 and 6 are to avoid unlock operation from unauthorized source. If mobile has no connectivity to web server when status code received from Hardware device, mobile will send this status code as a part of next Authentication UNLOCK request message to web server. Web server needs to retrieve this status code and update database info for previous authentication request.

Phone ID: (unique ID of the device, in an embodiment used with IPHONE/IPOD)

For example, detail on following HTTP post message is as shown here:

21562354214542145245525652199988265452 6s54d1rjhb34fgSfv109e96a3bf0d29dee4fa2b065c924ae350562f8b16

2 This post is done from iPhone

1 Unlock Request (use value 2 while sending status)

0 Status (only useful for status message)

09e96a3bf0d29dee4fa2b065c924aeeerggv1546e350562

18b16 Phone Id (in an embodiment, used for iPhone).

Unlock Request message will be supplied in variable "msg" in HTTP Post method. Web server can get this variable value using Request method.

string Req=Request["msg"]; // Get Supplied Message

Note: Web server shall send Response code (e.g., 200— OK, 401—Unauthorized, 500—Server's error).

a. Web Server Functionality

Web server authenticates user's Unlock Request message upon receiving message from mobile application. If request is authenticated successfully, it calls ITS provided API as follows:

1. Add reference to the project of the supplied dll file.

2. Import Namespace using Encryption;

3. Create class object.

4. Call API function to get encryption string. (TimerVal is the time in minutes for encryption key to be valid. strEncrypted is the encrypted string and web server needs to send it to the mobile application.

5. Web server will send encrypted string to mobile application using a .net API. If Authentication fails, the web server sends one character status code to Mobile Application:

Header 3 Char (Total length of the message, Status Code+Error string length)
Status 1 Char
Error message string
Status code to Message mapping:
1 LockID is not Valid
2 Phone number is not Valid
3 Bad Request Mobile application checks status code and does following:

When the status code is "0"—connect to hardware device using BlueTooth or Wi-Fi interface and send received encrypted message to hardware device.

When the status code is greater than "0"—display error string received in message to user.

a. Assumptions:
Mobile Application sends information to provided URL.
Mobile Application sends message to Web Server using HTTP post.
Web server uses variable name "msg" to get message from ITS mobile application.
Web server sends response message to ITS mobile application within 2 seconds from request received.

As can be seen from the above, the described principles allow a remote administrator to remotely control and track access to a specific lock. The administrator is able to observe lock activity such as when the lock was authorized and also when it was opened, and is also able to see error messages generated during or as a result of the opening or attempted opening. However, it is contemplated that other implementations of the disclosure may differ in detail from the foregoing examples.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for controlling a physical access control device by a mobile device using a wireless system, the method comprising:
   receiving, by a security authentication server through a first wireless network from the mobile device, an authentication request, the authentication request based on a command received via a second wireless network by the physical access control device from the mobile device;
   generating, by the security authentication server, a response message in response to the authentication request;
   transmitting, by the security authentication server to the physical access control device, the response message to enable the physical access control device to authenticate the command and to perform a physical access control operation corresponding to the command, wherein
      the system operates in a local mode if
         the first wireless network comprises a wide area wireless network and the second wireless network comprises a short-range wireless network; and
      the system operates in an online mode if
         the first and second wireless networks each comprise a WiFi network.

2. The method of claim 1, further comprising:
   authenticating the authentication request by the security authentication server.

3. The method of claim 2, wherein the response message comprises a first encoded portion and a second encoded portion, and further comprising:
   generating the first encoded portion by a first encryption engine corresponding with the command; and
   generating the second encoded portion by a second encryption engine corresponding with a series of identifiers stored for the physical access control device.

4. The method of claim 3, wherein the series of identifiers comprises a series of encoded shape patterns.

5. The method of claim 4, wherein the at least one of the series of encoded shape patterns comprises geometric shape patterns.

6. The method of claim 3, wherein the physical access control device further comprises a processor adapted to execute computer readable instructions, the processor comprising an encryption engine adapted to authenticate the series of identifiers by matching the series of identifiers with a second series of identifiers stored in a computer readable medium coupled with the physical access control device.

7. The method of claim 2, wherein the authentication request comprises:
   a Media Access Control address; and
   a lock identification code of the physical access control device.

8. The method of claim 2, wherein the first wireless network comprises a wide area wireless network having Internet access and the second wireless network comprises a peer to peer network if the system is operating in the local mode.

9. The method of claim 8, wherein the peer to peer network comprises at least one of a Bluetooth Network, a WiFi Network, a Wireless Ad Hoc Network, a Mobile Ad Hoc Network, a Smart phone Ad Hoc Network, a Personal Area Network, a RFID Network and a Wireless Mesh Network.

10. The method of claim 9, wherein the wide area wireless network having Internet access comprises a cellular network.

11. The method of claim 2, wherein
the first wireless network comprises an Internet enabled WiFi network and the second wireless network comprises an Ad Hoc WiFi network in Infrastructure mode if the system is operating in the online mode.

12. The method of claim 2, wherein the system allows for automatic wireless connection between the mobile device and the physical access control device if the mobile device is in communication proximity of the physical access control device.

13. The method of claim 1, wherein the physical access control device comprises at least one of a lock device, a garage door device, a building door, a car door, a trunk door, auto-ignition device and a gate device.

14. A method of providing security to a physical access control device configured to communicate with a mobile device in a wireless system, the wireless system having a security authentication server and operating in a local mode or in an online mode, the method comprising:
receiving, by a controller of the physical access control device via a first wireless network from the mobile device, a command, the command comprising a first encoded portion and a second encoded portion;
generating the first encoded portion by a first encryption engine corresponding with a functional command for the physical access control device from the mobile device;
generating the second encoded portion by a second encryption engine corresponding with the series of identifiers stored for the physical access control device;
authenticating, by the controller decoding the first encoded portion and the second encoded portion, the command prior to completing the functional command for the physical access control device; and
causing the functional command on the physical access control device upon completing the authenticating, wherein
the system operates in the local mode if
the first wireless network comprises a wide area Internet enabled wireless network and the second wireless network comprises a peer to peer wireless network; and
the system operates in the online mode if
the first and second wireless networks each comprise a WiFi network.

15. The method of claim 14, wherein the step of causing the functional command comprises:
delivering the functional command to the physical access control device for execution upon completing the authenticating.

16. The method of claim 15, wherein the execution of the functional command is completed if a set of authorization rules are met.

17. The method of claim 14, wherein the series of identifiers comprises a series of encoded shape patterns.

18. The method of claim 17, wherein the series of encoded shape patterns comprises geometric shape patterns.

19. The method of claim 17, wherein the physical access control device further comprises a processor adapted to execute computer readable instructions, the processor comprising an encryption engine adapted to authenticate the series of identifiers by matching the series of identifiers with a second the series of identifiers stored in a computer readable medium coupled with the physical access control device.

20. The method of claim 17, wherein the authentication request comprises:
a Media Access Control address; and
a lock identification code of the physical access control device.

21. The method of claim 14, wherein the first wireless network comprises a LAN-WiFi network and the second wireless network comprises the LAN-WiFi network enabled by an Internet Access Point if the system is operating in the online mode.

22. The method of claim 14, wherein the mobile device, if the system is operating in the local mode, communicates:
with the physical access control device via a short-range wireless network; and
with the security authentication server via a wide area wireless network.

23. The method of claim 22, wherein the short-range wireless network comprises at least one of Bluetooth network, Ad Hoc network, a WiFi network, a Zigbee network, a Z-Wave network, an Infrared network, a UWB network, a RFID Network, and Induction Wireless network.

24. The method of claim 22, wherein the wide area wireless network having Internet access comprises a cellular network.

25. The method of claim 14, wherein the mobile device, if the system is operating in the online mode, communicates:
with the physical access control device via the WiFi network in Infrastructure mode; and
with the security authentication server via the WiFi network having Internet access.

26. The method of claim 14, wherein the system allows for automatic wireless connection between the mobile device and the physical access control device if the mobile device is in communication proximity of the physical access control device.

27. The method of claim 14, wherein the physical access control device further comprises:
a processor executing computer readable instructions having an engine configured to authenticate the series of identifiers by matching the series of identifiers to a second series of identifiers stored in a computer readable medium coupled with the physical access control device.

28. The method of claim 14, wherein the physical access control device comprises at least one a lock device, a garage door device, a building door, a car door, a trunk door, auto-ignition device and a gate device.

29. A method of providing security to control access of a physical access control device, having a controller, over a wireless system through a mobile device, the method comprising:

transmitting, by the mobile device to an authentication server, an authentication request message, the authentication request message comprising information identifying the authentication server and the physical access control device;

generating, by the security authentication server, an authentication response message in response to the authentication request, the response message comprising a first encoded portion and a second encoded portion;

generating the first encoded portion by a first encryption engine corresponding with a command for the physical access control device from the mobile device;

generating the second encoded portion by a second encryption engine corresponding with a series of identifiers stored for the physical access control device; and transmitting, by the mobile device to the controller of the physical access control device, the received authentication response message to enable the controller to authenticate the response message and the command prior to completing a physical access control operation corresponding to the command.

30. The method of claim 29, wherein the series of identifiers comprises a series of encoded shape patterns.

31. The method of claim 30, wherein the series of encoded shape patterns comprises geometric shape patterns.

32. The method of claim 29, wherein the physical access control device further comprises a processor adapted to execute computer readable instructions, the processor comprising an encryption engine adapted to authenticate the series of identifiers by matching the series of identifiers with a second the series of identifiers stored in a computer readable medium of the physical access control device.

33. The method of claim 29, wherein the authentication request comprises:
a Media Access Control address; and
a lock identification code of the physical access control device.

34. The method of claim 29, wherein the mobile device, if the system is operating in a local mode, communicates:
with the physical access control device via a peer to peer wireless network; and
with the security authentication server via a wide area wireless network having access to the Internet.

35. The method of claim 34, wherein the peer to peer wireless network comprises at least one of a Bluetooth Network, a WiFi Network, a Wireless Ad Hoc Network, a Mobile Ad Hoc Network, a Smartphone Ad Hoc Network, a Personal Area Network, a RFID Network and a Wireless Mesh Network.

36. The method of claim 34, wherein the wide area wireless network having Internet access comprises a cellular network.

37. The method of claim 29, wherein the mobile device, if the system is operating in an online mode, communicates:
with the physical access control device via a WiFi network in Infrastructure mode; and
with the security authentication server via the WiFi network having Internet access to operate in Online mode.

38. The method of claim 37, wherein the mobile device communicates with the authentication server via an Internet enabled wide area network.

39. The method of claim 29, wherein the physical access control device further comprises:

a processor executing computer readable instructions having an engine configured to authenticate the series of identifiers by matching the series of identifiers to a second series of identifiers stored in a computer readable medium of the physical access control device.

40. The method of claim 29, wherein the physical access control device comprises at least one of a lock device, a garage door device, a building door, a car door, a trunk door, auto-ignition device and a gate device.

41. A security system for securing access to a physical access control device from a mobile device based on an authenticated command received by a controller of the physical access control device over a communication network, the wireless communication network comprising at least one of a wireless network, a cellular network, a peer to peer wireless network and a WiFi network, the WiFi network having an Internet access point, the security system comprising:

a security authentication server configured to receive an authentication request from the mobile device;
a physical access control device configured to receive an authenticated response message from the mobile device, the authenticated response message comprising a first and a second encoded portion,
the first encoded portion generated by a first encryption engine corresponding with a command message for the physical access control device; and
the second encoded portion generated by a second encryption engine based upon a series of identifiers stored for the physical access control device;
wherein
if the mobile device communicates with physical access control device via the peer to peer wireless network, the security system operates in a local mode; and
if the mobile device communicates with physical access control device via the Infrastructure WiFi network providing access to the Internet, the security system operates in an online mode.

42. The system of claim 13, wherein the series of identifiers comprises a series of encoded shape patterns.

43. The system of claim 42, wherein the series of encoded shape patterns comprises geometric shape patterns.

44. The system of claim 41, wherein the physical access control device further comprises a processor adapted to execute computer readable instructions, the processor comprising an encryption engine adapted to authenticate the series of identifiers by matching the series of identifiers with a second the series of identifiers stored in a computer readable medium of the physical access control device.

45. The system of claim 41, wherein the authentication request comprises:
a Media Access Control address; and
a lock identification code of the physical access control device.

46. The system of claim 41, wherein
the system communicates with the physical access control device using the peer to peer wireless network; and
the mobile device communicates with the system using the cellular network.

47. The system of claim 41, wherein the security authentication server authenticates and authorizes the mobile device to securely access the physical access control device in at least one of an online mode and a local mode.

48. The system of claim 41, wherein the mobile device includes Internet enabled functionality operable with the security authentication server subject to authorization access rights.

49. The system of claim 41, wherein the mobile device is configured to communicate via at least one of the Internet and the Internet access point of the WiFi network.

50. The system of claim 41, wherein the security authentication server authenticates and authorizes the mobile device to securely operate the physical access control device in at least one of an online mode and a local mode.

51. The system of claim 50, wherein the physical access control device is configurable to operate in at least one of the online mode and the local mode.

52. The system of claim 41, wherein the security authentication server, the physical access control device, and the Internet enabled mobile device are each configured to perform at least one of administrative management, operation of physical access control, monitoring and reporting.

53. The system of claim 52, wherein the administrative management comprises at least one of adding, suspending, deleting, and assigning user rights mobile device authorization rights for accessing each functional command and each available monitoring and reporting functional command.

54. The system of claim 52, wherein the operation comprises at least one of lock and unlock, based on communication proximity between the mobile device and a physical access control device.

55. The system of claim 24, wherein the monitoring and reporting comprises at least one of a lock status, an unlock status, a date and a time log of operations performed by the mobile device on the physical access control device.

56. The system of claim 41, wherein the physical access control device further comprises:
   a processor executing computer readable instructions having an engine configured to authenticate the series of identifiers by matching the series to a second series of identifiers stored in a computer readable medium coupled with the physical access control device.

57. The system of claim 41, wherein the physical access control device comprises at least one of a lock device, a garage door device, a building door, a car door, a trunk door, auto-ignition device and a gate device.

* * * * *